US008562278B2

(12) United States Patent
Johnson et al.

(10) Patent No.: US 8,562,278 B2
(45) Date of Patent: Oct. 22, 2013

(54) SIDE-DISCHARGE CHIPPER BODY

(75) Inventors: Terry Johnson, Quincy, IL (US); Tyler Marquardt, Quincy, IL (US)

(73) Assignee: The Knapheide Manufacturing Company, Quincy, IL (US)

( * ) Notice: Subject to any disclaimer, the term of this patent is extended or adjusted under 35 U.S.C. 154(b) by 0 days.

(21) Appl. No.: 13/043,344

(22) Filed: Mar. 8, 2011

(65) Prior Publication Data

US 2011/0222996 A1 Sep. 15, 2011

Related U.S. Application Data

(60) Provisional application No. 61/312,097, filed on Mar. 9, 2010.

(51) Int. Cl.
*B60P 1/00* (2006.01)

(52) U.S. Cl.
USPC .......... 414/502; 414/507; 414/523; 414/528; 414/813

(58) Field of Classification Search
USPC .......... 414/502, 507, 523, 528, 813; 144/373, 144/337; 241/37.5, 83
See application file for complete search history.

(56) References Cited

U.S. PATENT DOCUMENTS

| | | | | |
|---|---|---|---|---|
| 3,809,269 | A * | 5/1974 | Lundahl | 414/502 |
| 5,005,620 | A * | 4/1991 | Morey | 144/373 |
| 7,083,129 | B2 * | 8/2006 | Beam, III | 241/37.5 |

* cited by examiner

*Primary Examiner* — Saul Rodriguez
*Assistant Examiner* — Willie Berry, Jr.
(74) *Attorney, Agent, or Firm* — Brevetto Law Group

(57) ABSTRACT

A side-discharge chipper body to be mounted on vehicle used to pull a tree limb chipper. The side-discharge chipper body includes a forestry box adapted to receive chipped landscape materials from a chipper, a side door pivotally mounted to the forestry box, and a conveyor assembly disposed within the forestry box and adapted to discharge chipped landscape material stored within the forestry box out the side door. The side-discharge chipper body can be mounted to a truck chassis. A chipper can be towed behind the vehicle with the side discharge body to provide a landscape removal system.

20 Claims, 39 Drawing Sheets

SIDE-DISCHARGE CHIPPER BODY

CROSS-REFERENCE TO RELATED APPLICATIONS

The present application claims priority from, and incorporates by reference in its entirety, Provisional U.S. patent application 61/312,097 filed Mar. 9, 2010.

BACKGROUND

1. Technical Field

Various embodiments of the present invention relate to vehicle mounted implements for use in the tree trimming and lawn care industry, and more specifically, to the chipper body of a truck configured to collect landscape materials from a tow-behind wood chipper.

2. Description of Related Art

A tow-behind wood chipper is typically mounted on trailer with a pair of wheels and a hitch so that it can be towed behind a truck. The truck designed for use with such a chipper typically has a chipper body mounted on the truck's chassis to collect the chipped landscape materials dispensed from the outfeed of the chipper. The tow-behind wood chipper grinds up waste landscape materials—typically tree limbs, stumps, branches, leaves, weeds, plants or the like—and blows the chips into the truck's chipper body. When the interior of the chipper body is filled with chips, or when the landscape job is completed, the landscaper can drive the truck and tow-behind wood chipper to a designated area and empty the chipper body.

A conventional chipper body mounted on a truck empties through a gate at the back of the truck. Consequently, the tow-behind chipper must be unhitched from the rear of the truck in order to empty the conventional chipper body. An attempt to empty the conventional chipper body without moving the truck away from the chipper would result in a large pile of chipped landscape materials being dumped between the truck and the tow-behind chipper still connected to the truck. Conventional chipper bodies typically empty their contents by hoisting the front of the chipper box and dumping the contents through the back gate. These conventional chipper bodies are pivotally mounted to the truck chassis, and raised to a dump position by a hydraulic hoist mounted between the front end of the chipper body and the truck chassis. In this way the chips stored in the chipper body are dumped from the rear end of the chipper body.

This operation can be difficult and time consuming. The landscaper must unhitch the chipper to perform the dumping operation. The hoists used to lift such conventional chipper bodies can fail by "freezing." Also, if there are power lines or other obstructions overhead, the landscaper may need to raise an aerial measuring rod to ensure there is sufficient vertical clearance before the chipper body can safely be raised to the dump position. Since the truck's chipper body is hoisted, it can be difficult to unload the contents in a storage shed unless there is considerable vertical clearance. In addition to the landscaper operating the hoist, a spotter may be needed to further visually ensure that the chipper body does not hit any overhead obstructions when raised. After the chipper body is emptied, the chipper must be re-hitched to the truck before returning to work. It generally takes two workers to re-hitch the chipper on to the truck's hitch.

BRIEF SUMMARY

Various embodiments of a chipper body are disclosed that provide a discharge system for discharging chipped landscape material stored inside the chipper body out the side of the chipper body. Advantageously, a chipper towed behind the truck equipped with the side-discharge chipper body can remain hitched to the vehicle while chipped landscape material is being dispensed from the chipper body. Chips can be dispensed from the chipper body without the need to raise the chipper body to an inclined dump position, thereby avoiding the added equipment and operational steps associated with the use of a hoist to raise the chipper body.

In various embodiments, a side-discharge chipper body includes a forestry box adapted to receive chipped landscape material from a chipper, a side door pivotally mounted to the forestry box, and a conveyor disposed within the forestry box and adapted to discharge chipped landscape material stored within the forestry box out the side door.

In another aspect of the disclosure, a vehicle includes a chassis and the side-discharge chipper body mounted to chassis. To provide a landscape removal system, a chipper can be mounted to the side-discharge chipper body, which, in turn, is mounted to the chassis of a truck.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1:
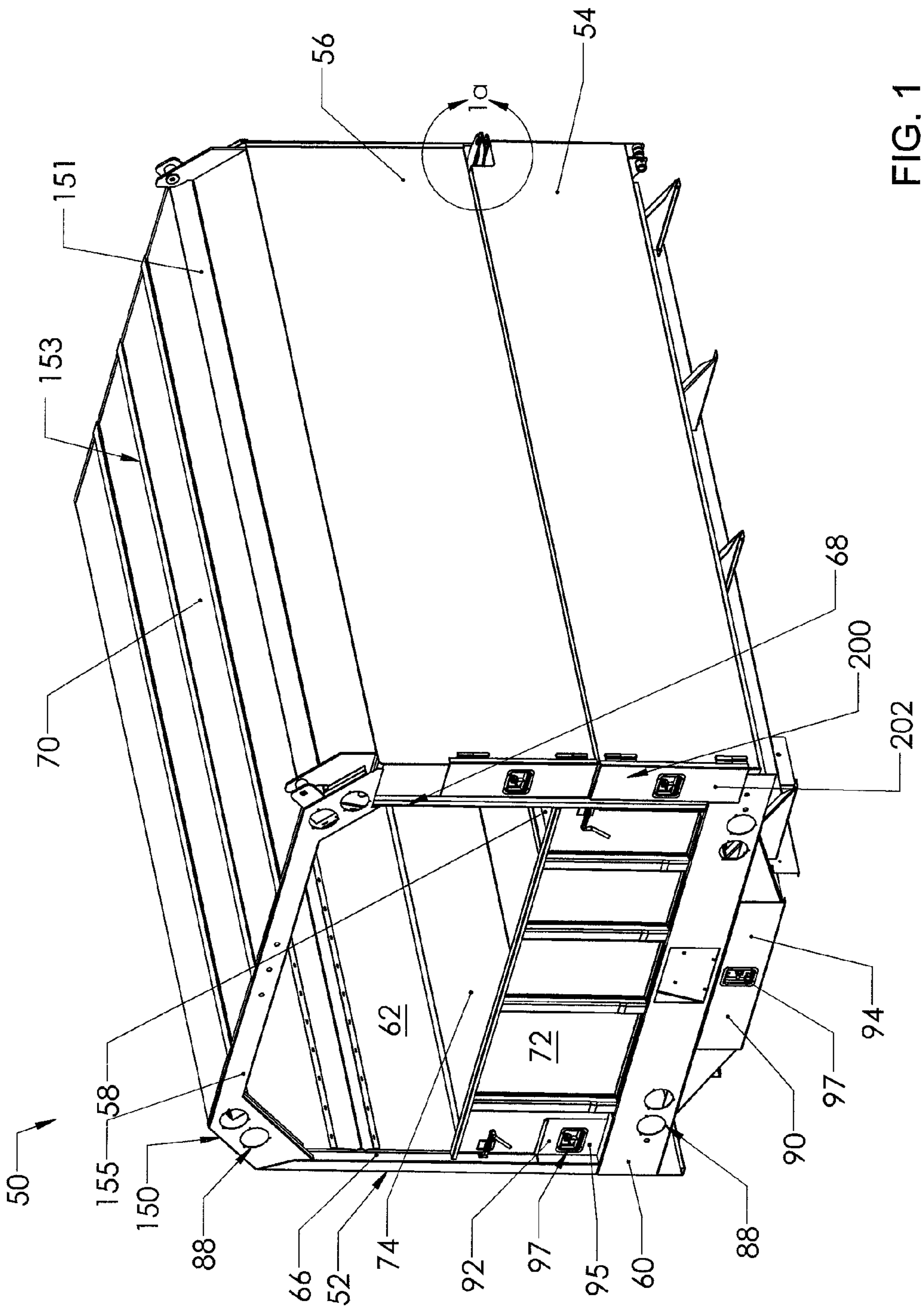
FIG. 1 is a rear isometric view of an embodiment of a side-discharge chipper body.

FIG. 1 is a rear isometric view of an embodiment of a side-discharge chipper body. The chipper body 50 of FIG. 1 includes a forestry box 52 configured to be mounted on a vehicle, for example, on a truck chassis. The forestry box 52 is adapted to receive chipped landscape materials from a chipper, a lower side door 54 pivotally mounted to the forestry box 52, an upper side door 56 pivotally mounted to the forestry box 52, a conveyor 58 (see also FIG. 17), and an open rear end 66. The chipper body 50 is typically configured to receive chipped landscape material blown in from the tow-behind chipper through the open rear end 66. The conveyor 58 is adapted to discharge chipped landscape material stored within the forestry box 52 through the side access doors, that is, out of the side doors 54, 56. The vehicle (e.g., truck) on which the forestry box 52 is mounted typically has an axel running side-to-side between wheels located underneath the forestry box 52. The conveyor 58 is typically adapted to discharge chipped landscape materials out the side of said vehicle, and as such operates in a direction parallel to the vehicle axel, that is, side-to-side.

Figure 5:
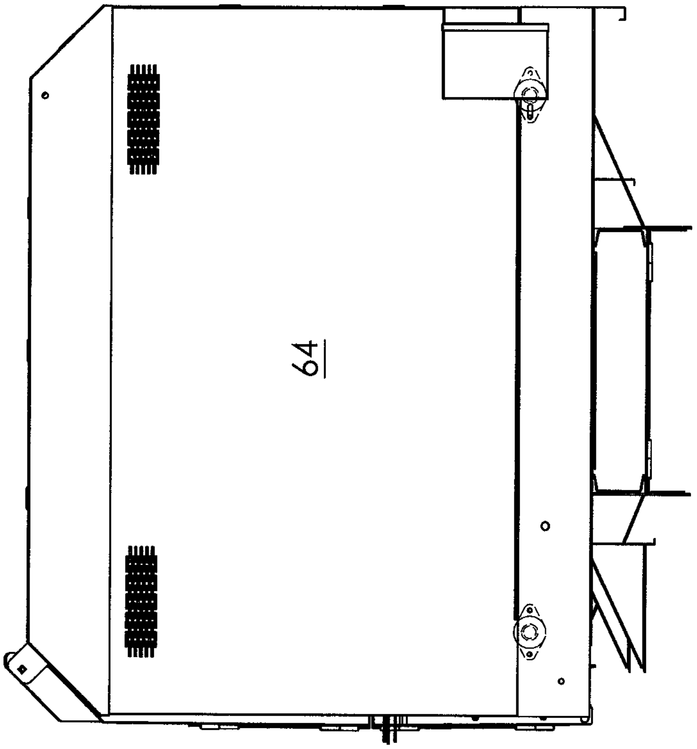
FIG. 5 is a front elevational view of the chipper body of FIG. 1.
Figure 6:
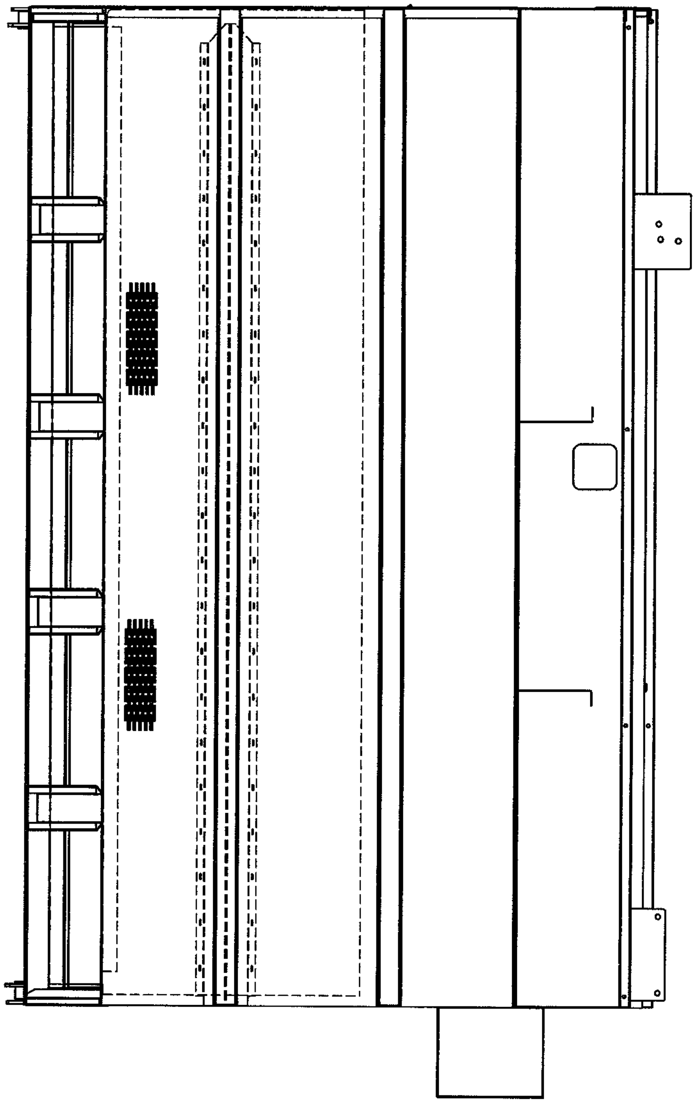
FIG. 6 is a left side elevational view of the chipper body of FIG. 1.

A typical embodiment of the forestry box 52 includes a base 60, a fixed sidewall 62 extending vertically from the base 60, a front end wall 64 (see also FIGS. 3 and 5) extending vertically from the base 60 and contiguous with the fixed sidewall 62, an open rear end 66, an upright support 68 disposed adjacent the rear end 66 of the forestry box 52 and adjacent the side doors 54, 56, a canopy 70 supported by the fixed sidewall 62, the front end wall, and the support arm 68, and a tailgate 72 disposed at the rear end 66 of the forestry box 52 and extending between the sidewall 62 and the support arm 68. The forestry box 52 defines a collection chamber 74 adapted to receive chipped landscape material through the open rear end 66 and to store the chipped landscape material therein. The waste landscape materials from the tow-behind chipper are typically blown into the collection chamber 74 through the open rear end 66. Then when the collection chamber 74 is full, or otherwise ready to be emptied, the conveyor 58 pushes the waste landscape materials out of forestry box 52 through the openings created by side doors 54, 56. In this way, the chipper body 50 is configured so the chips or other waste landscape materials can enter through the back of the collection chamber 74 (e.g., be blown in by the tow-behind chipper) and then be discharged through the side of the collection chamber 74 (e.g., be pushed out by conveyor 58).

Figure 7:
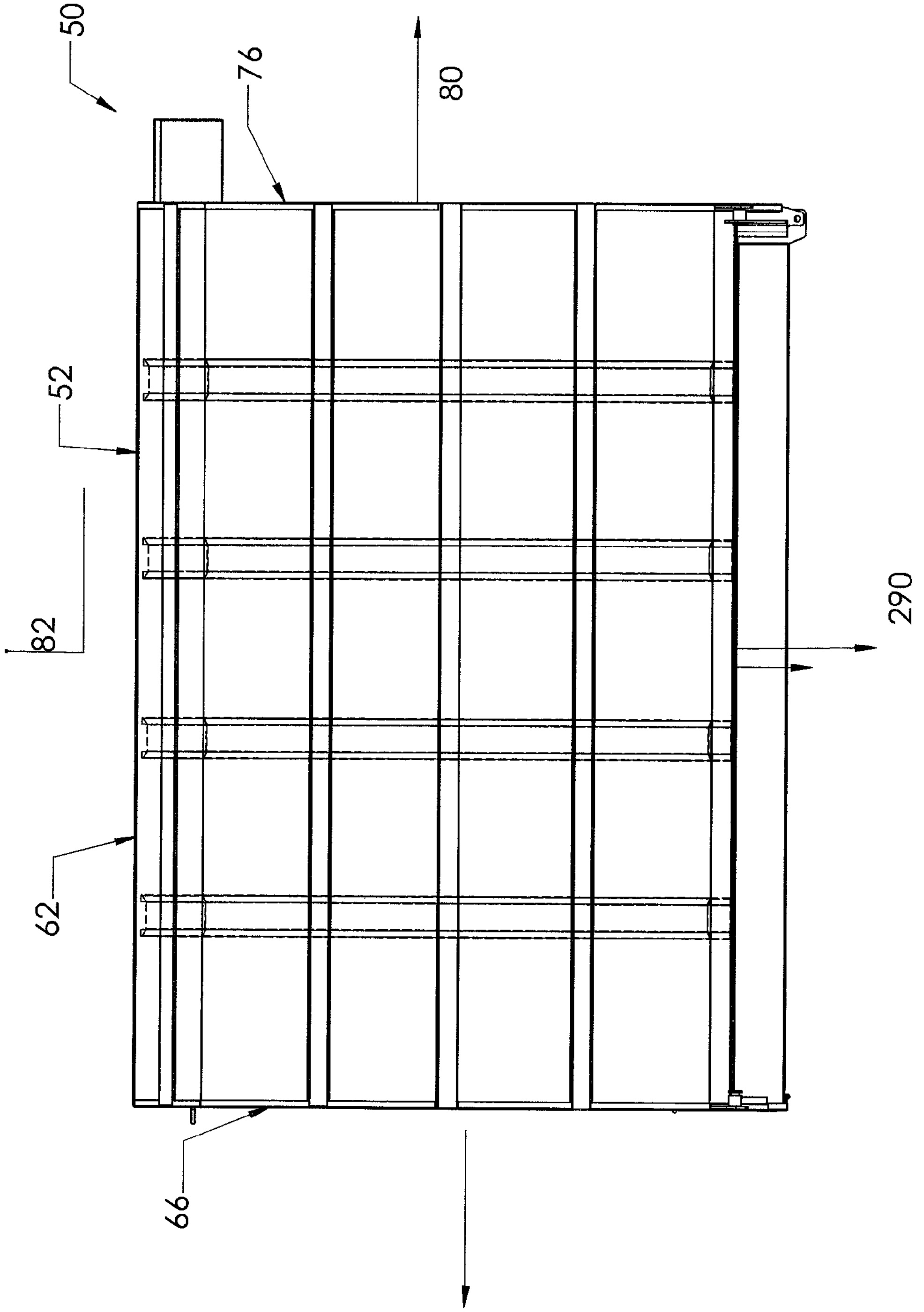
FIG. 7 is a top plan view of the chipper body of FIG. 1.
Figure 8:
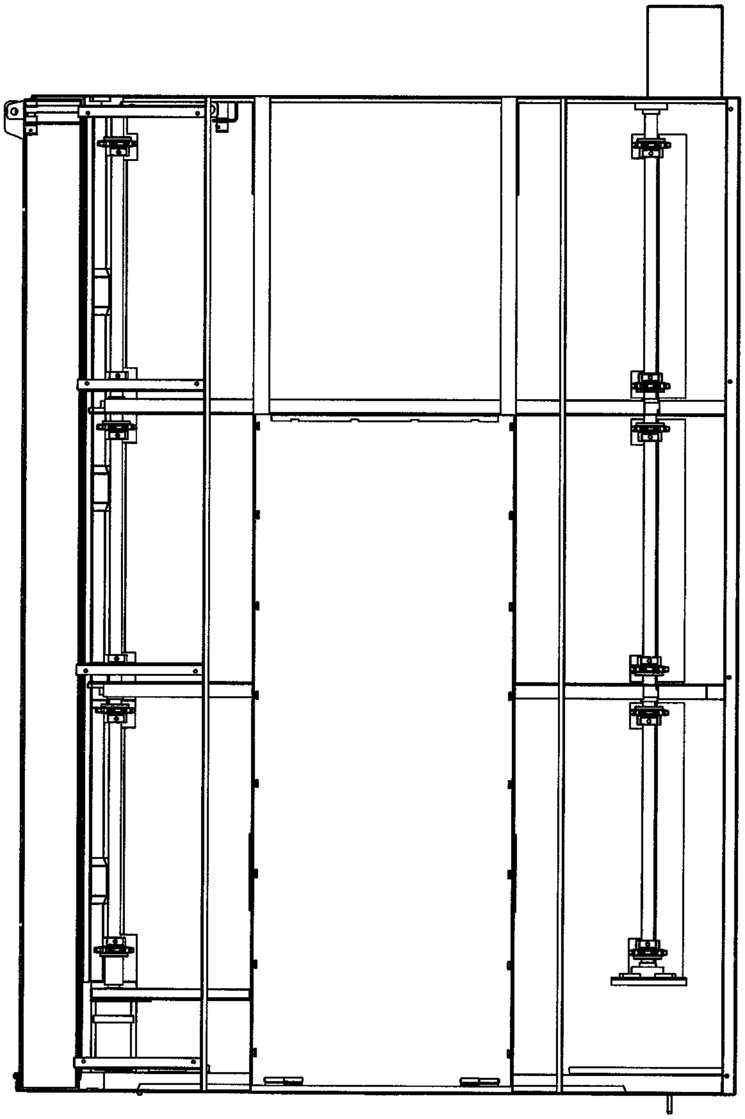
FIG. 8 is a bottom plan view of the chipper body of FIG. 1.
Figure 9:
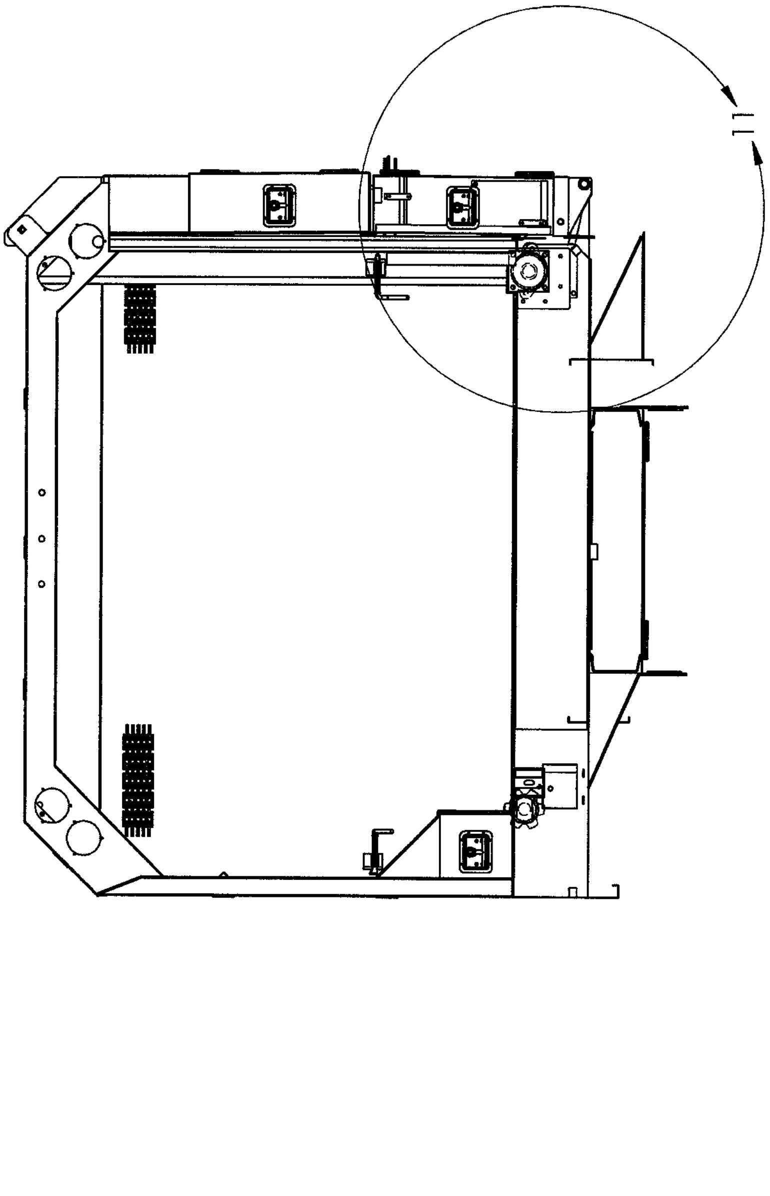
FIG. 9 is a cross-sectional view of the chipper body of FIG. 1 taken along line 9-9 in FIG. 4.

FIG. 7 is a top plan view of the chipper body of FIG. 1. As shown in FIG. 7, the open rear end 66 and the front end 76 of the forestry box 52 define a longitudinal axis 80 of the chipper body 50 (e.g., the longitudinal direction being the lengthwise, or front-to-back, direction of forestry box 52). The open rear end 66 through which the chipped landscape materials enter the collection chamber 74 is at the longitudinal back end of the vehicle, that is, the end nearest the trailer hitch for towing the chipper. The length of the fixed sidewall 62, measured along the longitudinal axis 80 of the chipper body 50, is typically greater than the width of the rear end 66 (or front end 76). The width of the rear end 66 (or front end 76) may be measured along a transverse axis 82 of the chipper body 50, which typically is substantially perpendicular to the transverse axis 80 thereof This may also be seen in FIG. 8 which is a bottom plan view of the chipper body of FIG. 1.

Turning again to FIG. 1, the rear end 66 of the forestry box may be configured to include a plurality of openings 88 that are adapted to receive corresponding vehicle lights. Examples of vehicle lights typically configured within the openings 88 include rear position lights or tail lights, brake lights, reverse lights, turn signal lights, warning lights, multi-function lights, or the like. The forestry box 52 may include one or more modular equipment storage areas such as 90 and 92, respectively accessible via hinged covers 94 and 95. Each cover 94, 95 is movable to an open position by operating a twist latch with a pivotable T-handle 97. The “possum belly” equipment storage area 90 is disposed at the base 60 of the forestry box 52 and is configured to accommodate conventional landscaping equipment, such as, rakes, shovels, and ladders, for example. The sidewall equipment storage area 92 is disposed adjacent the fixed sidewall 62 in a relief cut of the tailgate 72 and extends the length of the chipper body 50.

Figure 2:
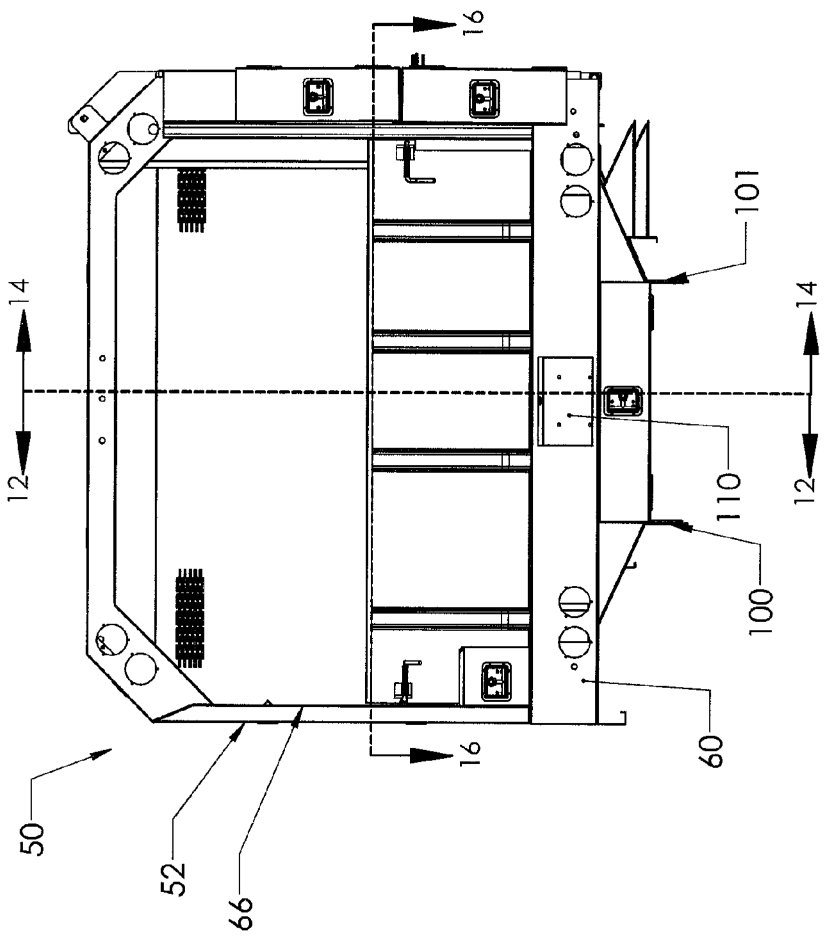
FIG. 2 is a rear elevational view of the chipper body of FIG. 1.

FIG. 2 is a rear elevational view of the chipper body of FIG. 1. FIG. 2 shows the base 60 of the forestry box 52, which is typically configured to include one or more supporting beams. The embodiment depicted in FIG. 2 includes a pair of beams 100, 101 that extend the length of the forestry box 52. The beams 100, 101 are adapted to mount the chipper body 50 to a chassis of a truck. The base 60 includes other supporting structure to increase the strength and rigidity of the chipper body. The base 60 of the forestry box includes a mounting plate 110 disposed at the rear end 66 of the forestry box. The mounting plate 110 is adapted to retain the vehicle portion of a conventional trailer hitch of a towable chipper as is known in the art. Various other embodiments of the side-discharge chipper body feature different types of hitches suitable for towing a variety of different commercially-available chippers.

Figure 17:
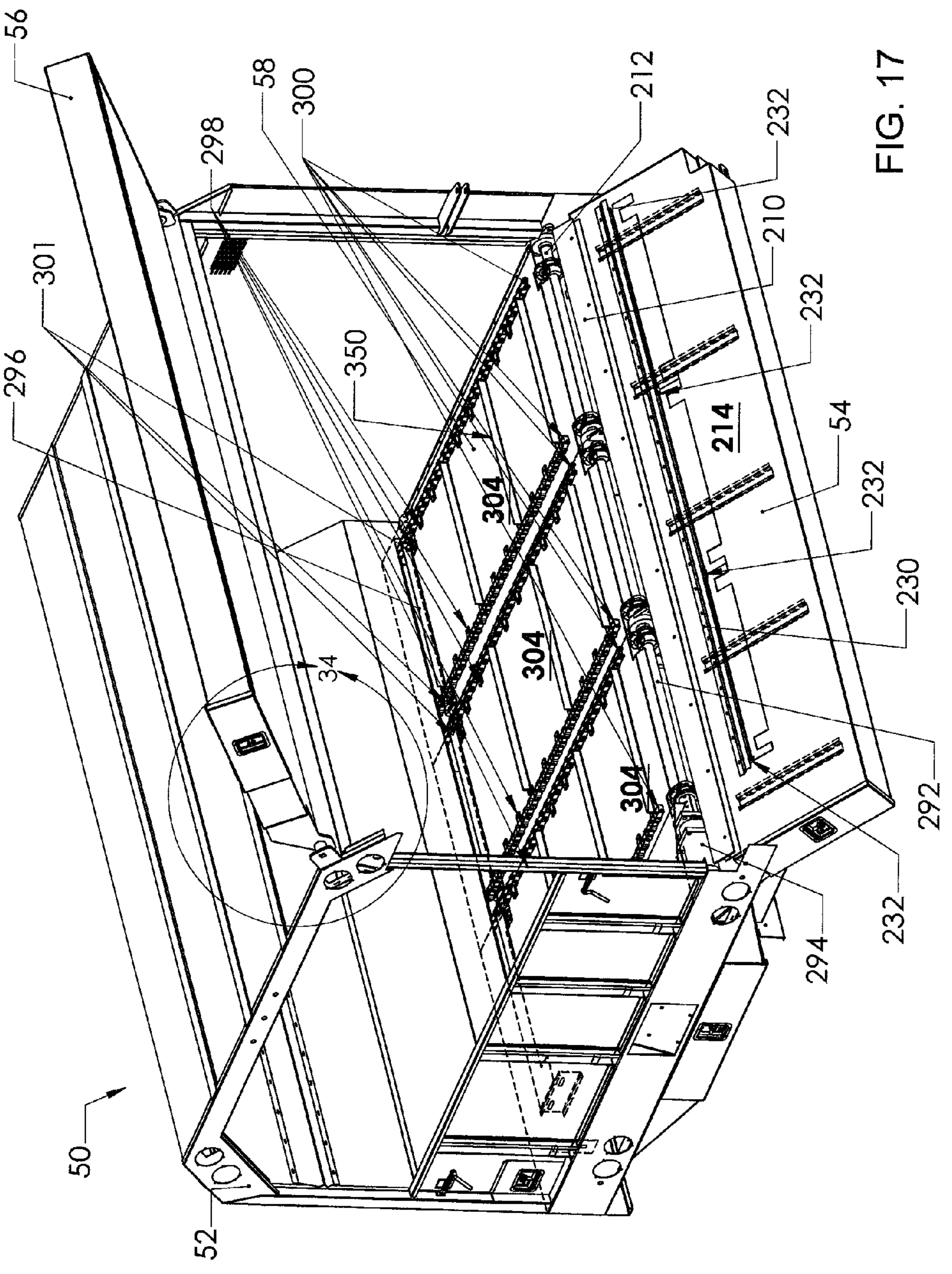
FIG. 17 is a rear isometric view of the chipper body of FIG. 1 with a pair of side doors in a fully open position.
Figure 17A:
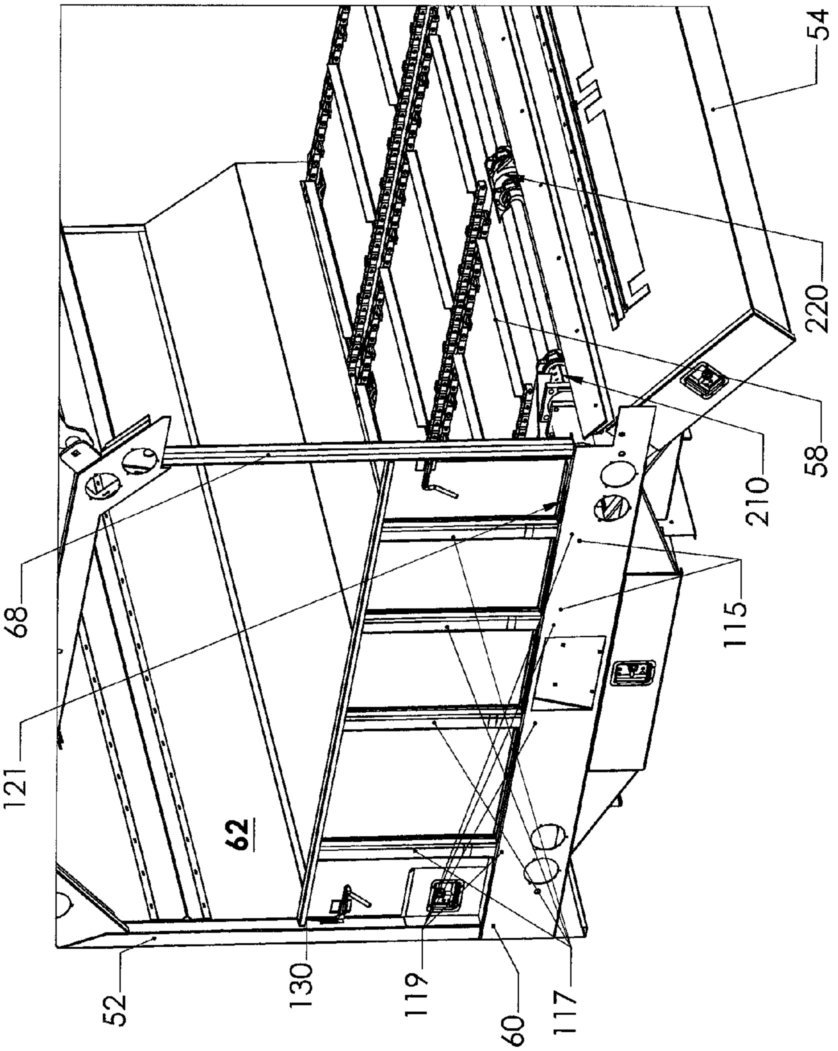
FIG. 17A is an enlarged rear isometric view as in FIG. 17 but with a rear panel of a forestry box removed for illustrative purposes.
Figure 21:
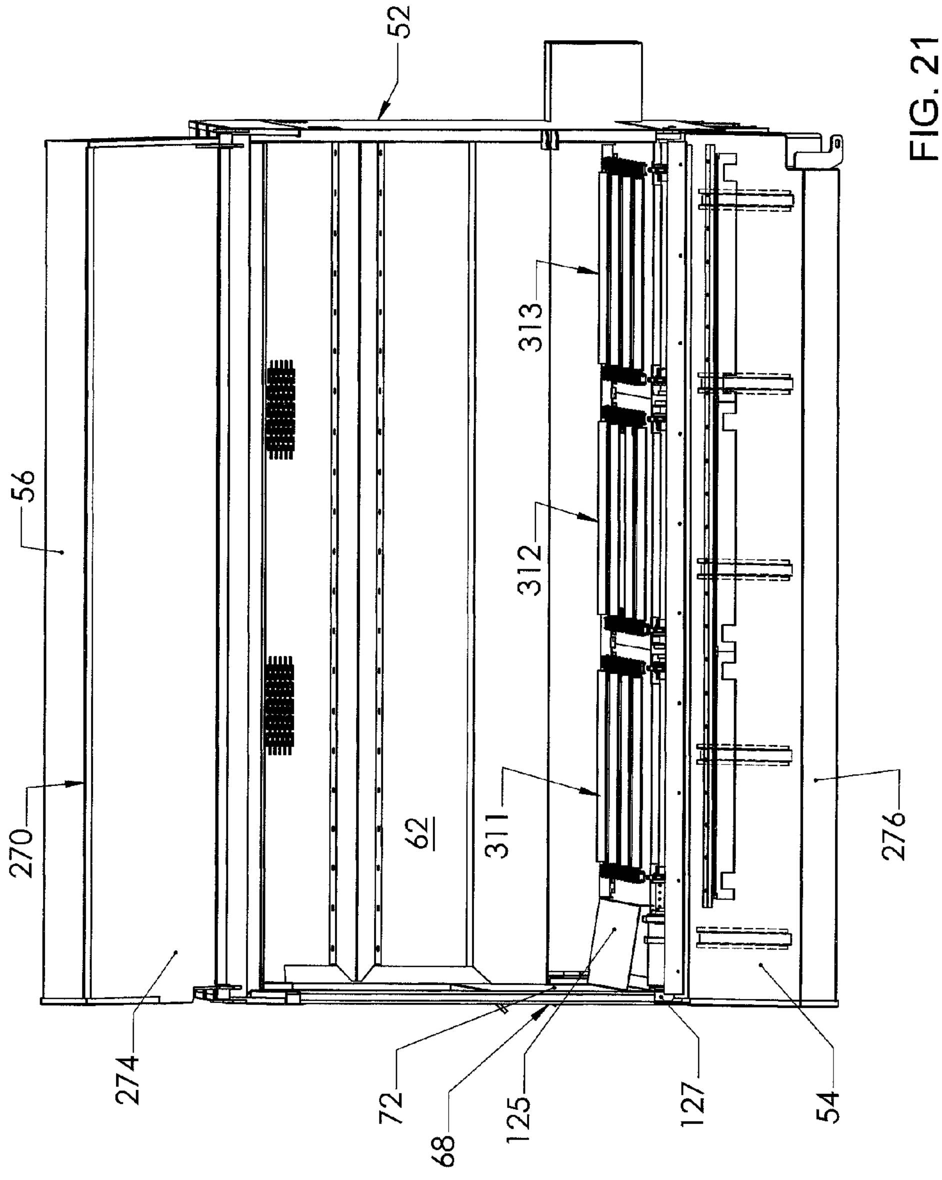
FIG. 21 is a right side perspective view of the chipper body of FIG. 1 with the side doors in the fully open position.

Referring to FIG. 17A, in some embodiments the base 60 includes a plurality of mounting pockets 115 corresponding to a plurality of vertical uprights 117 of the tailgate 72. A stub portion 119 of each upright 117 extends a predetermined distance below a lower edge 121 of the tailgate 72 and is configured to retentively engage the corresponding mounting pocket 115 of the base. As shown in FIG. 21, the base 60 includes a tapered stop 125 disposed in spaced relationship to the rear edge 127 of the base a sufficient distance to accommodate the thickness of the tailgate 72 once the stub portions of the tailgate 72 are inserted in the mounting pockets of the base. With the tailgate 72 so installed, the tailgate 72 is in engaged relationship with the tapered stop 125 of the base to help support the tailgate 72 in the upright position.

Figure 20:
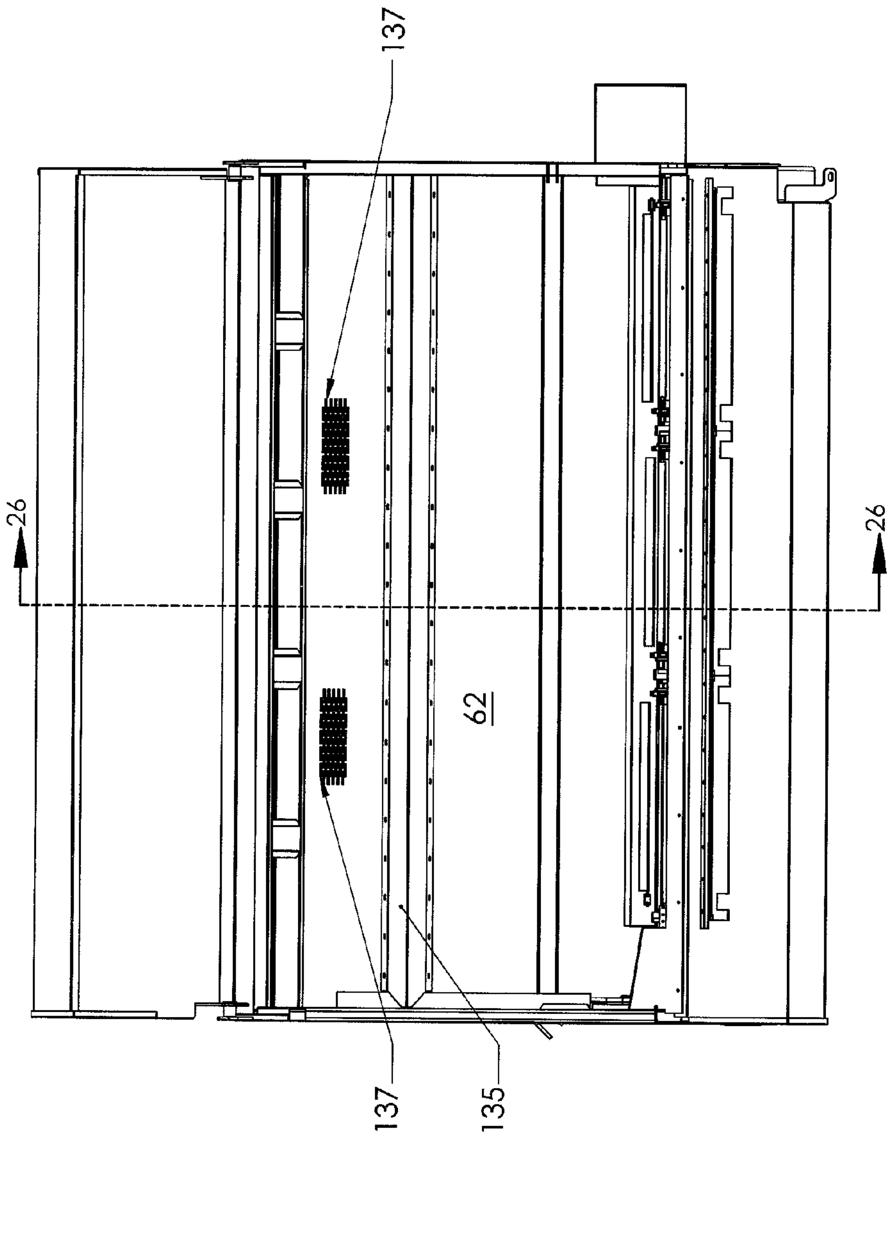
FIG. 20 is a right side elevational view of the chipper body of FIG. 1 with the side doors in the fully open position.

The fixed sidewall 62 and the support arm 68 of the forestry box 52 each includes a mounting socket 130 adapted to retentively receive a pin configured to further help retain the tailgate 72 in an installed, upright position, as shown in FIG. 17A, effectively pinning the tailgate 72 between the pins on the exterior side of the tailgate and the tapered stop on the interior side of the tailgate. In the embodiments depicted in FIG. 20 the fixed sidewall 62 includes a reinforcing rib 135 and a plurality of ventilation grills 137. The reinforcing rib 135 extends the longitudinal length of the fixed sidewall 62.

Figure 26:
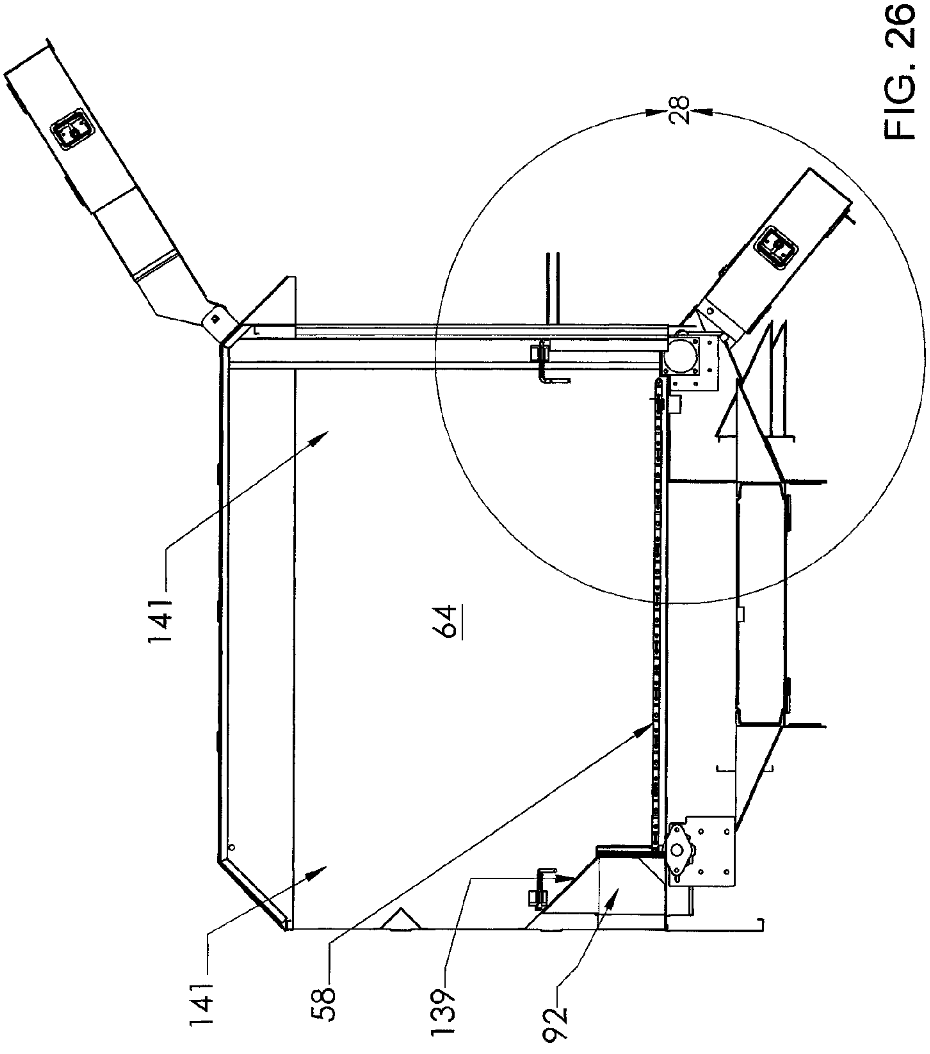
FIG. 26 is a cross-sectional view of the chipper body of FIG. 1 taken along line 26-26 in FIG. 20.
Figure 27:
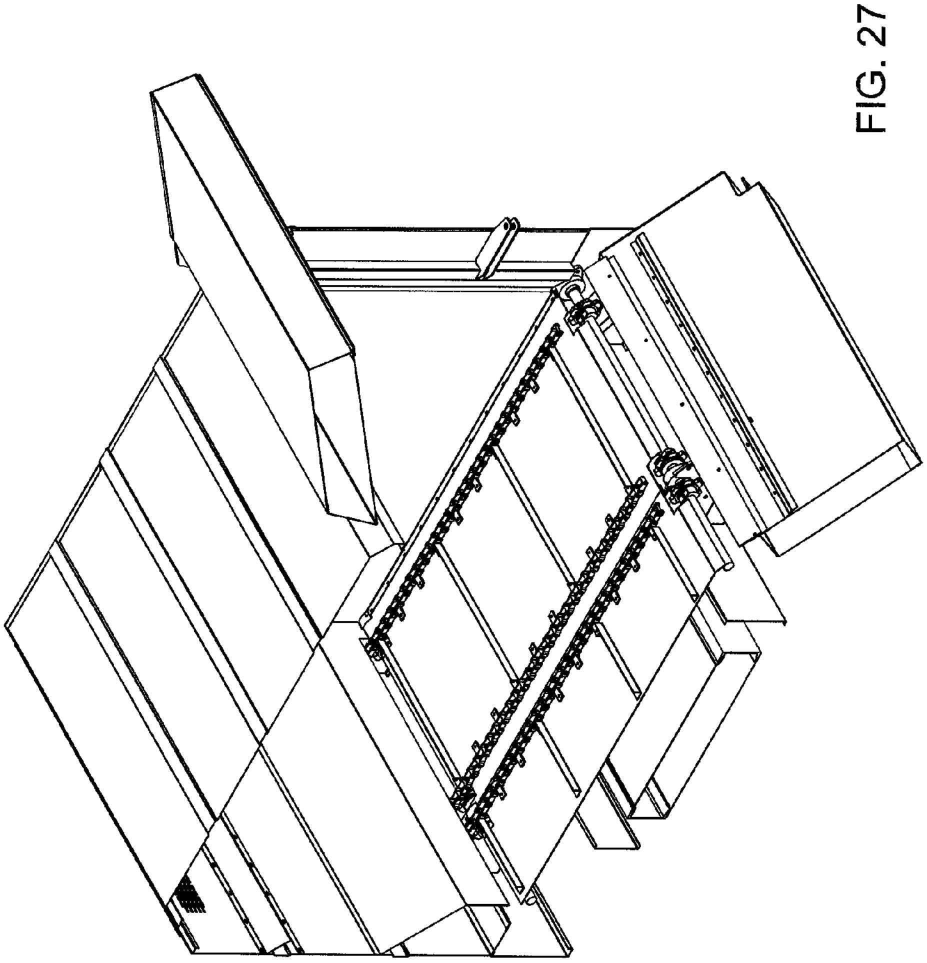
FIG. 27 an isometric view of the cross-sectional view of FIG. 26.

Turning to FIG. 26, the sidewall equipment storage area 92 includes a sloped top 139 to urge any landscape chips to fall therefrom onto the conveyor assembly 58. The front end 64 of the forestry box includes a plurality of ventilation grills 141. The canopy 70, as shown in FIG. 1, provides rigidity to the forestry box, helps protect chipped landscape materials disposed within the storage chamber 74 of the forestry box from the outside weather conditions, and helps retain the chipped landscape material within the forestry box. The canopy 70 includes a pair of tapered side sections 150, 151 that extends the longitudinal length of the canopy 70 and a substantially planar central section 153. The canopy 70 includes a rear flange 155 extending downwardly therefrom. The rear flange 155 houses some of the taillight openings 88 to help increase the visibility of the chipper body 50 at night.

The lower side door 54 is pivotally mounted to the forestry box 52 such that it is movable about a lower door pivot axis 160 (FIG. 4) over a range of travel between a closed position (FIG. 1) and a range of open positions (FIG. 17 showing one open position). The lower door pivot axis 160 is located near the bottom of the side opening of forestry box 52, that is, within 12 inches of the bottom of the side opening of forestry box 52. The lower side door 54 is pivotably pinned to the base 60 of the forestry box 52 at its front and rear end via a pair of lower door pin connectors. The lower door pin connectors define the lower door pivot axis 160, which is substantially parallel to the longitudinal axis of the chipper body. The open positions that lower door 54 can be set to include any of various angles in the range between horizontal (straight out, or 90 degrees) and downward vertical (straight down, or 180 degrees). A typical open position for emptying the forestry box 52 is 45 degrees below horizontal (135 degree) as depicted in FIG. 17. The open position of substantially 45 degrees below horizontal is 45 degrees below horizontal plus or minus 15 degrees (i.e., 15 to 60 degrees below horizontal). The 45 degrees below horizontal position, and the substantially 45 degrees below horizontal position, both ensure that the chipped landscape material being discharged will fall somewhat away from the vehicle—that is, at least one foot away from the vehicle—therefore helping to prevent them from spreading under the vehicle as the discharged pile grows larger. Any other range between horizontal to 90 degrees below horizontal may be used for the range of open positions. Configuring the lower door 54 to pivot at the bottom rather than the top allows the door to be used as a sort of ramp to direct the discharged pile of chipped landscape material away from the vehicle.

Figure 1A:
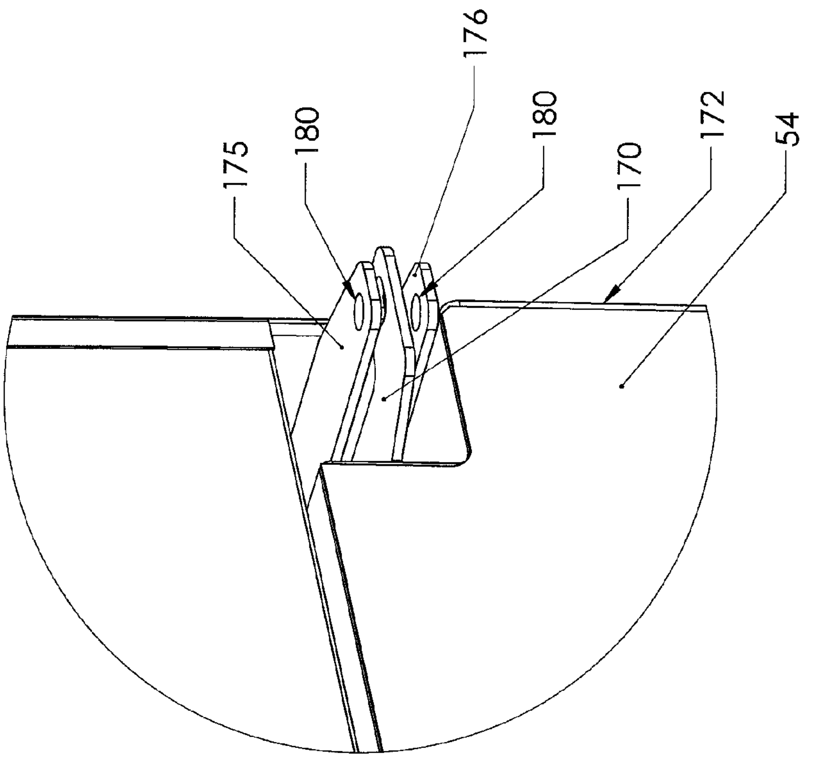
FIG. 1A is an enlarged, detail view taken from the area around circle 1*a* in FIG. 1.
Figure 1B:
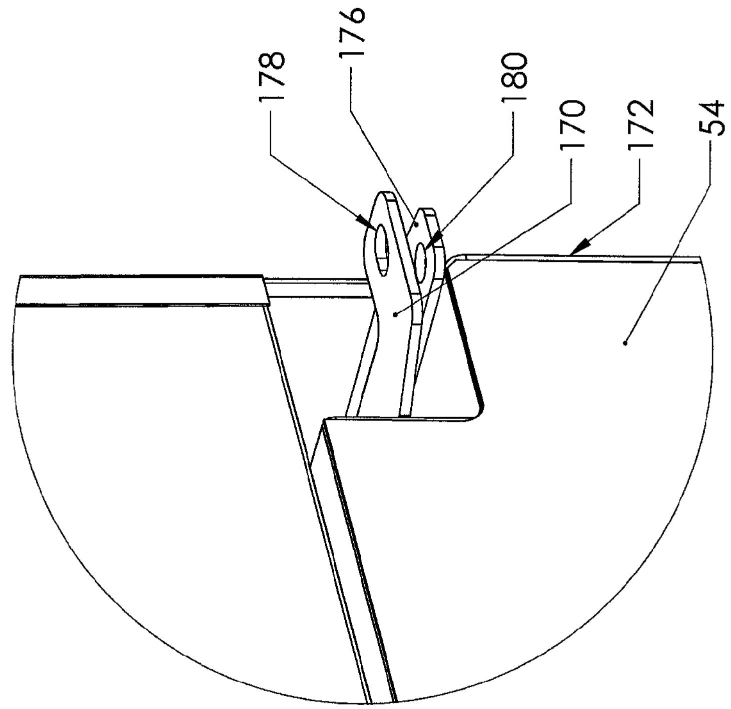
FIG. 1B is a view as in FIG. 1*a* except with a retaining tab removed for illustrative purposes.

Referring to FIGS. 1A and 1B, the lower door 54 includes a retaining bracket 170 disposed adjacent its front edge 172. The retaining bracket 170 is adapted to matingly align with a pair of retaining tabs 175, 176 that are connected to the forestry box. When the lower door 54 is in the closed position, the retaining bracket 170 of the lower door is disposed between the retaining tabs 175, 176 of the forestry box. A retaining hole 178 in the retaining bracket 170 of the lower door 54 is aligned with a corresponding retaining hole 180 in each retaining tab 175, 176. A retaining pin can be inserted through the aligned holes 178, 180 to further retain the lower door 54 in the closed position to enhance the safety of the lower door by helping to prevent inadvertently opening the lower door, for example, when the truck with the chipper body 50 is being moved from one location to another. In some embodiments the lower door 54 is configured so it cannot be moved to one of the opened positions until the retaining pin is removed.

Figure 22:
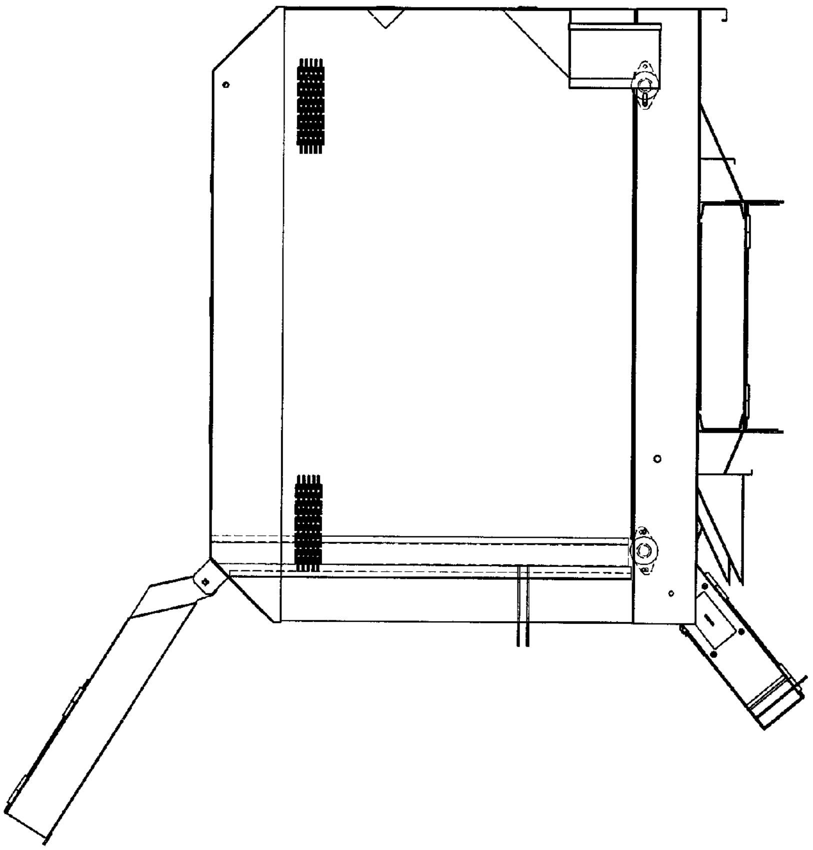
FIG. 22 is a front elevational view of the chipper body of FIG. 1 with the side doors in the fully open position.
Figure 22A:
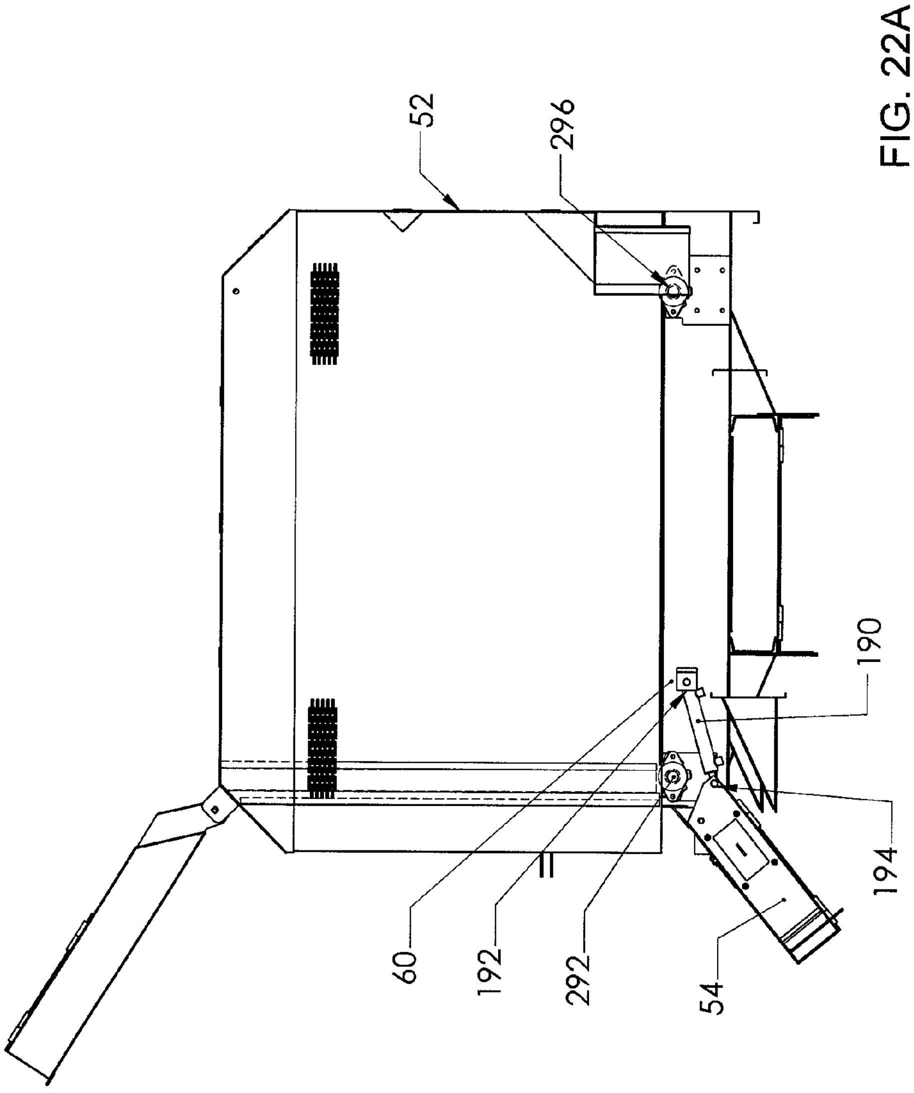
FIG. 22A is a view as in FIG. 22 but with a panel of a base of the forestry box and a panel of an equipment storage area removed for illustrative purposes.
Figure 23:
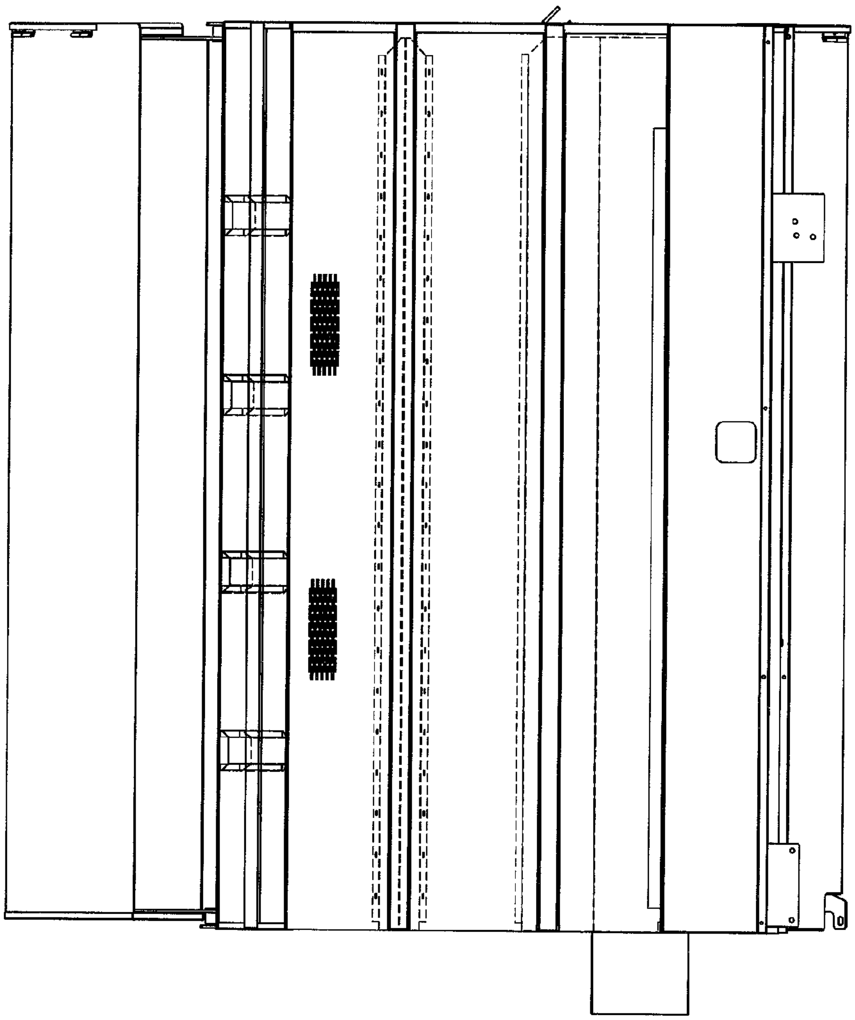
FIG. 23 is a left side elevational view of the chipper body of FIG. 1 with the side doors in the fully open position.
Figure 24:
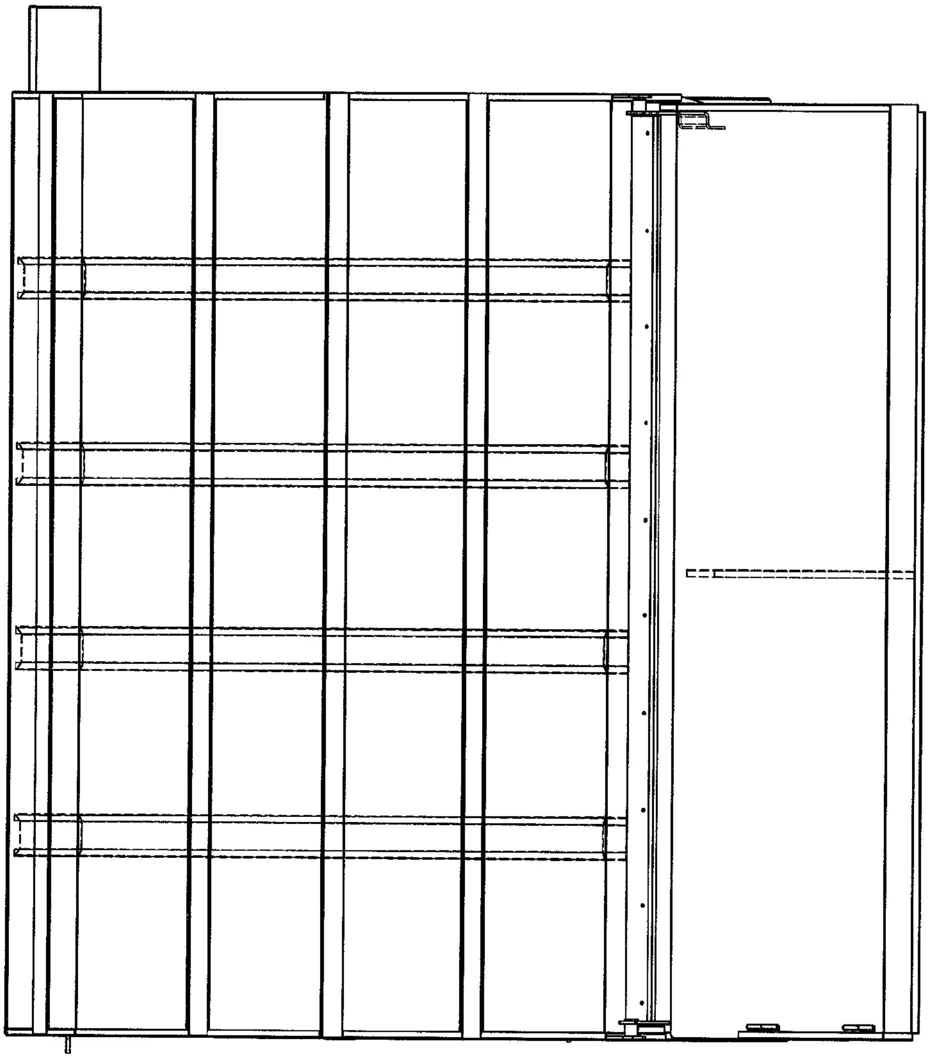
FIG. 24 is a top plan view of the chipper body of FIG. 1 with the side doors in the fully open position.
Figure 25:
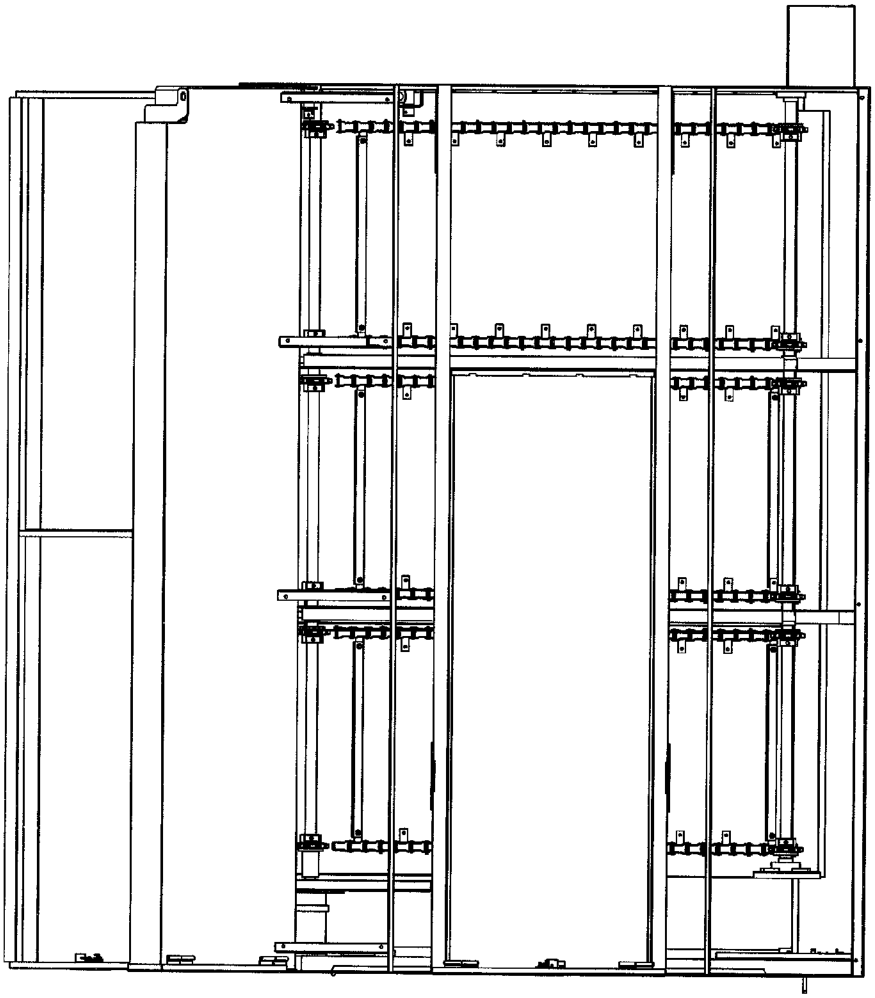
FIG. 25 is a bottom plan view of the chipper body of FIG. 1 with the side doors in the fully open position.

Turning to FIG. 22A, a hydraulic cylinder 190 is typically provided to hydraulically move the lower door 54 between the closed position (FIG. 1) and one of a range of open positions, e.g., with one of the open positions being shown in FIG. 22A. The hydraulic cylinder 190 is connected at one end 192 to the base 60 of the forestry box 52 and at the other end 194 to the lower door 54. The hydraulic cylinder 190 can be in hydraulic connection with a hydraulic fluid source to selectively operate the hydraulic cylinder. A controller can be provided in at least one designated area, such as the truck cab or on the exterior of the forestry box, for example, to facilitate the selective operation of the hydraulic cylinder.

Figure 3:
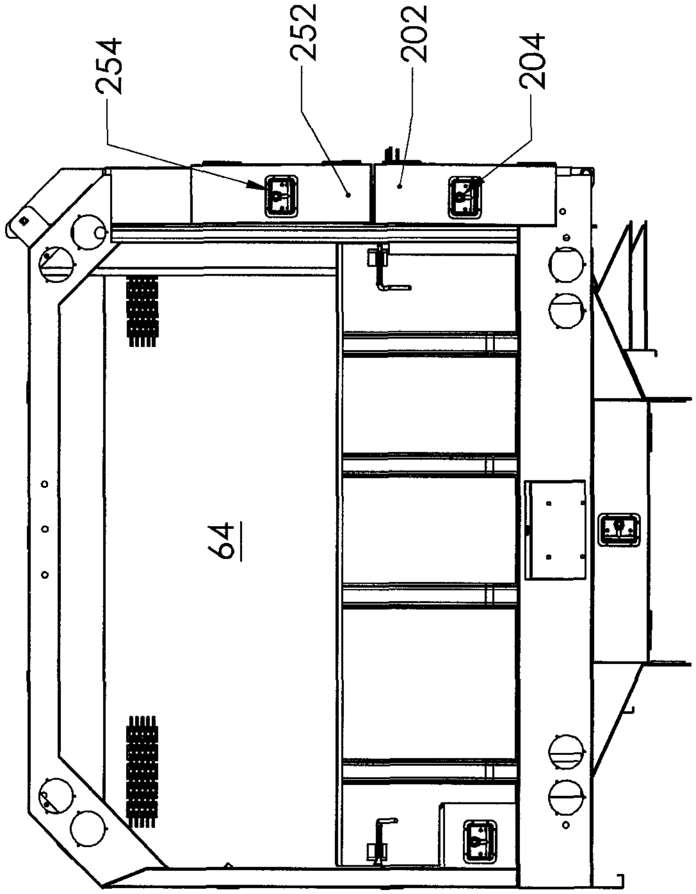
FIG. 3 is a rear perspective view of the chipper body of FIG. 1.
Figure 10:
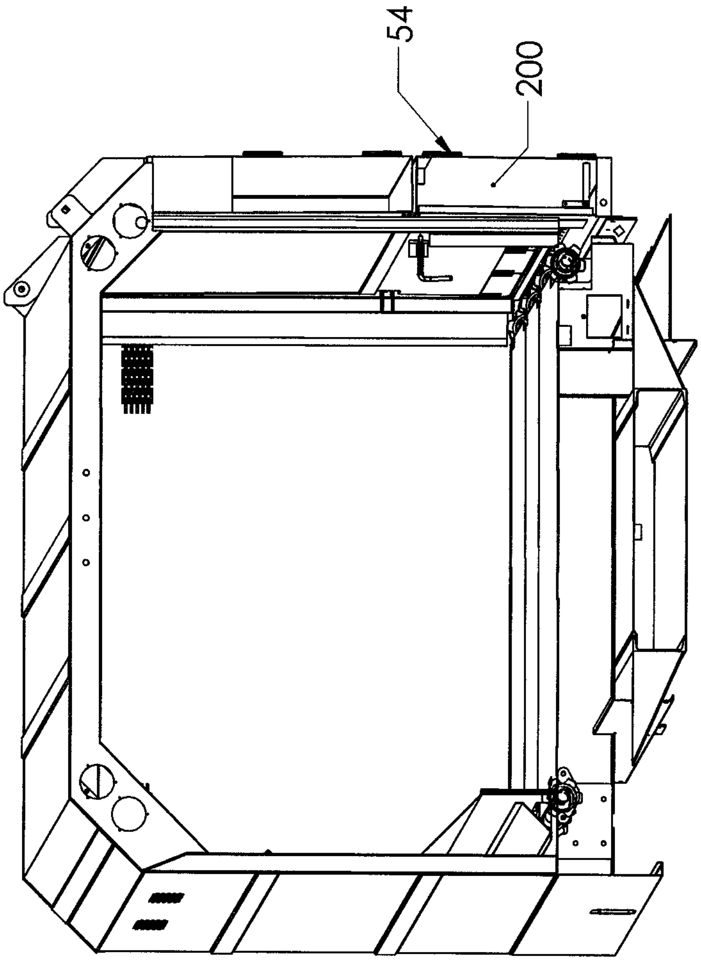
FIG. 10 is the cross-sectional view of FIG. 9 in perspective.

Referring to FIGS. 1 and 10, the lower door 54 may be configured with a hollow construction and includes a modular equipment storage area 200 accessible via a hinged cover 202. The cover 202 is movable from a closed position to an open position by operation of a twist latch via a flip-out T-handle 204, as shown in FIG. 3. The lower door equipment storage area 200, or "ladder box," is configured to accommodate longer landscaping equipment, such as, a ladder, for example.

Referring to FIG. 17, the lower door 54 includes a filler element in the form of a rubber wear strip 210 extending from its lower end 212 on an interior surface 214 thereof. Referring to FIG. 17A, the rubber wear strip 210 is adapted to contactingly engage a discharge end 220 of the endless conveyor 58 in the forestry box to reduce, or eliminate, the air gap between the discharge end of the conveyor and the lower door 54 when the lower door is in the open position. The contacting relationship between the rubber strip 210 of the lower door and the discharge end 220 of the conveyor helps decrease the incidence of chipped landscape material from being pushed underneath the conveyor 58 or falling to the ground between the discharge end of the conveyor and the lower edge of the lower door. The rubber strip 210 aids substantially in preventing the chipped landscape material from jamming up the conveyor 58 by preventing chipped landscape material from going beneath the conveyor 58 as is rotates around shaft assembly 296 and sprockets 301. The resiliently flexible nature of the rubber wear strip 210 allows the strip to be in contacting relationship with the conveyor 58 without substantially affecting the operation of the conveyor.

In other embodiments, a filler element used in place of the wear strip 210. The filler element can be in the form of a plurality of stiff bristles (in place of or in addition to the rubber strip). The bristles can project from the lower edge of the lower door to help fill any gap between the lower edge of the lower door and the discharge end of the conveyor. The bristles are sufficiently stiff and arranged to support the chipped landscape material passing over the bristles so that the chipped landscape material is impeded from falling through any gap between the discharge end of the conveyor and the lower edge of the lower door when the door is in the open position. In yet other embodiments, the lower door pivot axis and/or the lower door can be configured such that the lower edge of the lower door is disposed below and inward of the discharge end of the endless conveyor when the lower door is in at least one of the open positions.

Figure 11:
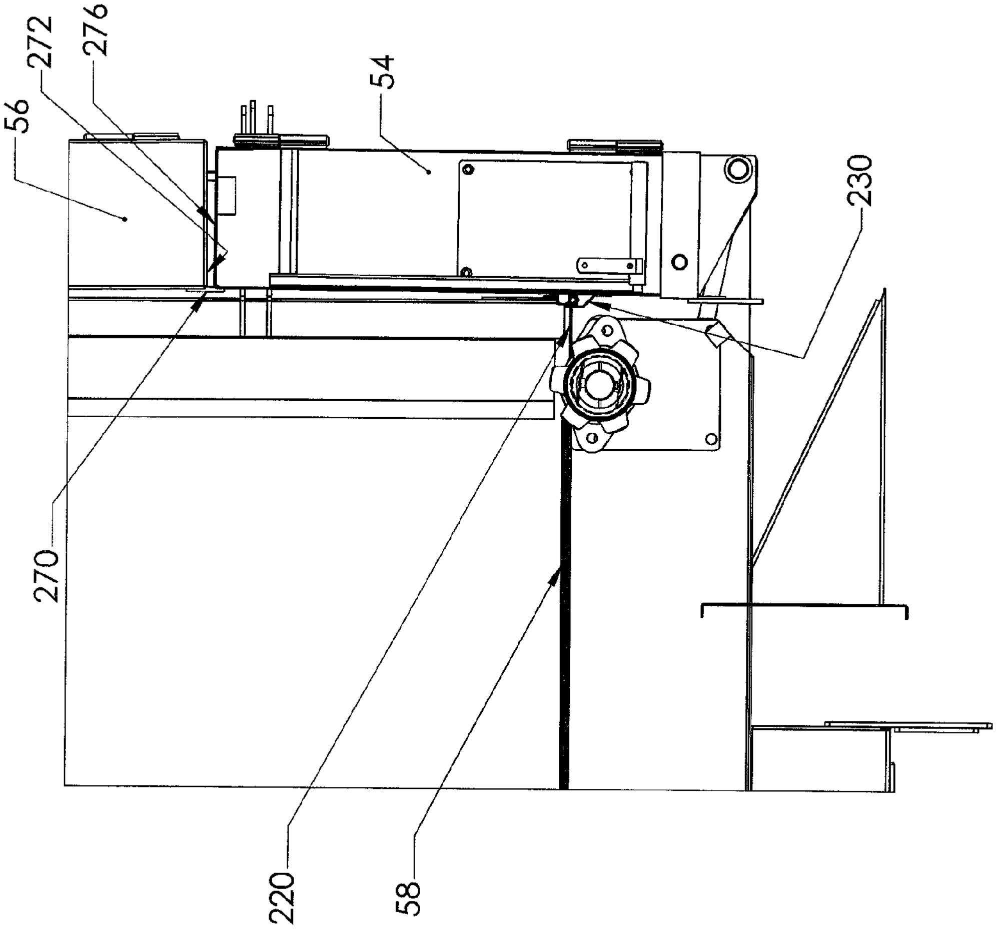
FIG. 11 is an enlarged detail view taken from FIG. 9 as indicated by circle 11.

Turning again to FIG. 17, the interior surface 214 of the lower door 54 includes a seal 230 movably mounted thereto. A plurality of stops 232 may be provided to limit the range of travel of the seal 230 to a predetermined range. The seal 230 is adapted to engage the discharge end 220 of the conveyor 58 when the lower door 54 is in the closed position, as shown in FIG. 11. The seal 230 can be made from any suitable material, such as a resiliently flexible metal. The seal 230 can engagingly contact the discharge end 220 of the conveyor 58 when the lower door 54 is in the closed position to help prevent chipped landscape material stored within the forestry box from dropping out of the box inadvertently through any gap between the conveyor 58 and the lower door 54.

Figure 4:
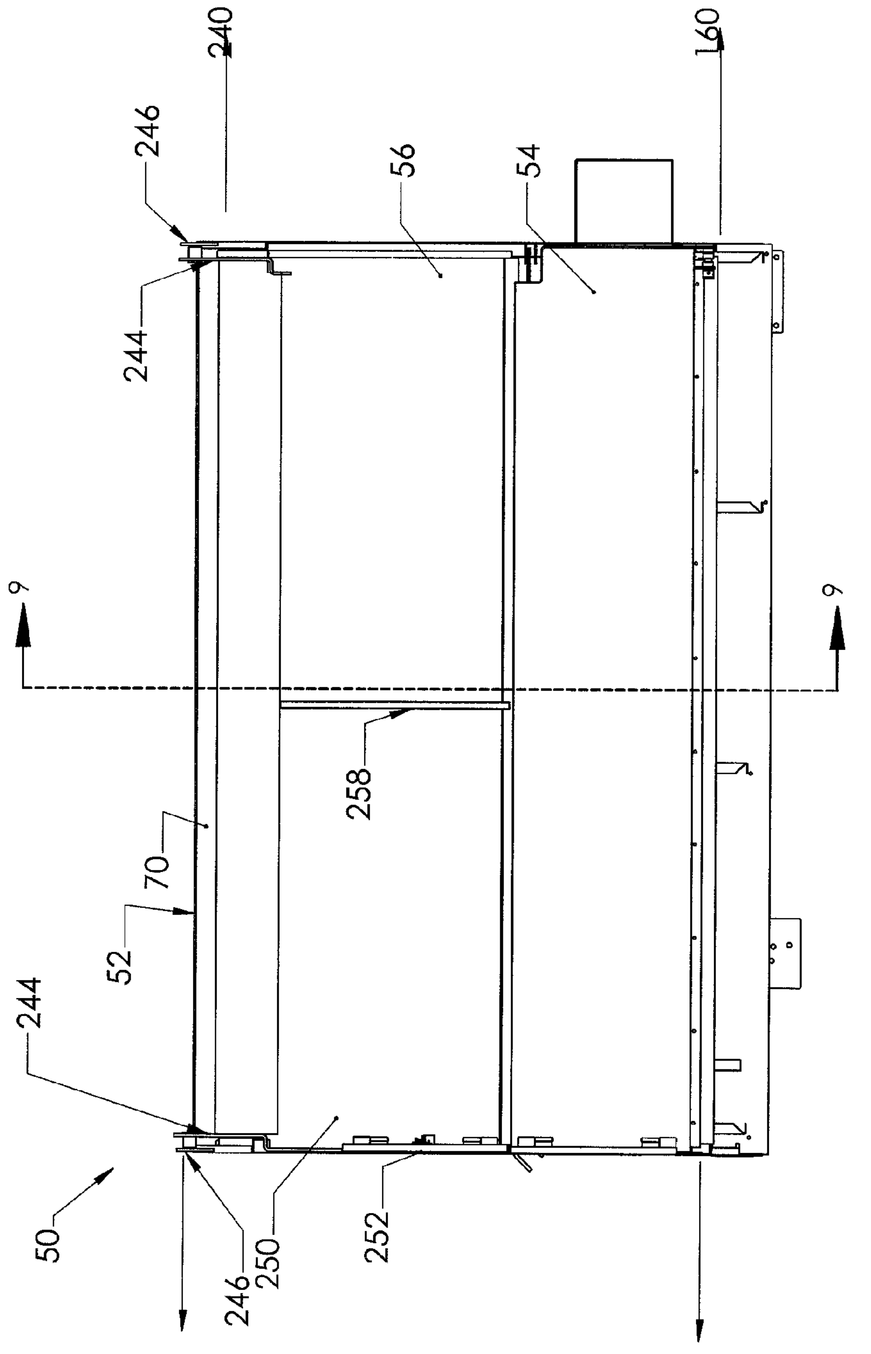
FIG. 4 is a right side elevational view of the chipper body of FIG. 1.

FIG. 4 depicts an embodiment of the upper side door 56 which is pivotally mounted to the forestry box 52 such that it is movable about an upper door pivot axis 240 over a range of travel between a closed position (FIG. 1) and a range of open positions (FIG. 17 showing one open position). The upper side door 56 is pivotably pinned to the canopy 70 of the forestry box at its front and rear end via a pair of upper door pin connectors. The upper door 56 includes a pair of mounting tabs 244, and the canopy 70 of the forestry box 52 includes a mating pair of mounting tabs 246. The respective mounting tabs 244, 246 cooperate together to retentively support the pin connectors such that the upper door can rotate with respect to the forestry box. The upper door pin connectors define the upper door pivot axis 240, which is substantially parallel to the longitudinal axis of the chipper body 50 and to the lower door pivot axis 160.

The upper door 56 may be configured with a hollow construction that includes a modular equipment storage area 250 accessible via a hinged cover 252. The cover 252 is movable from a closed position to an open position by operation of a twist latch via a flip-out T-handle 254 (FIG. 3). The upper door equipment storage area 250 is configured to accommodate assorted conventional landscaping equipment, such as, fold-up work and/or hazard signs, for example. The equipment storage area 250 of the upper door 56 is accessible at the rear end of the upper side door and includes a blank 258 disposed intermediate the length of the upper door so that the equipment storage area is sized to prevent smaller items stored in the storage area 250 from sliding too far forward to be conveniently accessed from the rear of the upper door 56. In other embodiments, a blank such as the blank 258 can be positioned a different distance from the rear end of the upper door. In yet other embodiments, the upper door can be equipped with a hinged cover at its front end to provide a pair of equipment storage areas with one accessible from the rear end and the other accessible from the front end of the upper door. In still other embodiments, the blank can be omitted.

Figure 19:
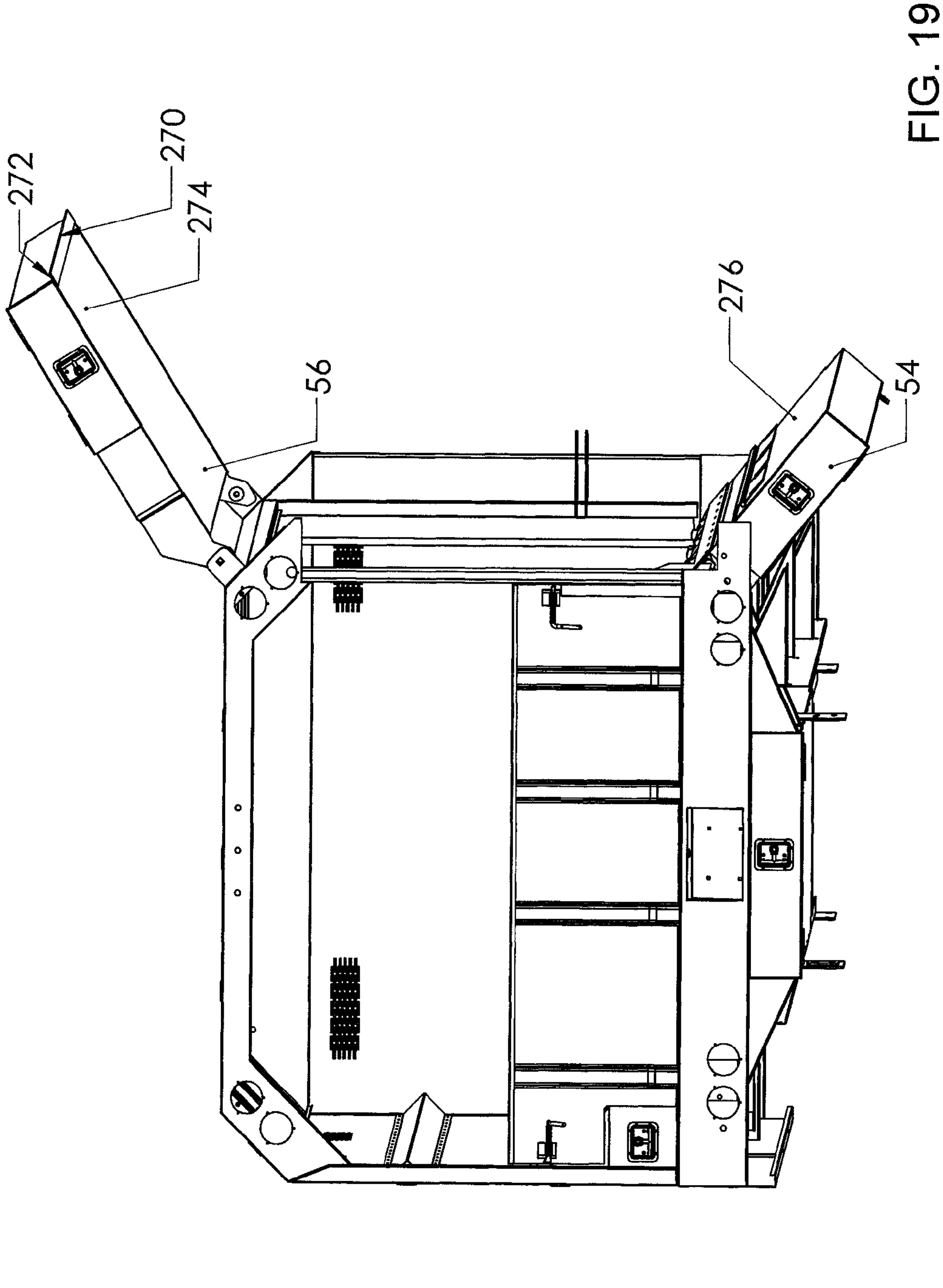
FIG. 19 is a rear perspective view of the chipper body of FIG. 1 with the side doors in the fully open position.

Turning to FIGS. 19 and 21, the upper door 56 includes a lip 270 extending from its lower edge 272 on an interior surface 274 thereof. The lip 270 is adapted to substantially cover the gap between the lower edge 272 of the upper door 56 and an upper edge 276 of the lower door 54 when the doors 54, 56 are in their closed positions (see FIG. 11). The lip 270 thereby provides a secondary barrier to help prevent chipped landscape material stored in the forestry box from inadvertently falling out of the box via any gap between the upper and lower doors when they are closed.

Although the upper door 56 is shown in FIG. 17 in a fully open position, in use the upper door 56 may be configured to freely move within a range of open positions in response to the amount of chipped landscape material flowing out of the forestry box via the conveyor. The upper door 56 is allowed to pivot about the upper door axis in response to the forces acting upon it, such as the outward thrust of the discharged landscape material and the downward action of gravity. In some embodiments, an interlock system can be provided to ensure that the upper door 56 is disposed in a fully closed position before allowing the lower door 54 to move to the closed position to ensure that the lip 270 of the upper door 56 is disposed adjacent the interior surface of the lower door 54 when the doors 54, 56 are closed.

Referring to FIGS. 17 and 17A, the endless conveyor 58 is disposed within the forestry box 52 and is adapted to discharge chipped landscape material stored within the forestry box 52 out the side doors 54, 56. Referring to FIG. 7, a top plan view of the chipper body 50, the conveyor is adapted to convey chipped landscape materials disposed within the forestry box 52 in a discharge direction 290 along the transverse axis 82 of the chipper body 50, which is substantially perpendicular to the longitudinal axis 80 of the chipper body 50. The conveyor 58 acts in concert with the base of the forestry box to support and retain chipped landscape material within the collection chamber until the conveyor is operated to discharge chipped landscape material from the forestry box out the lower side door.

FIG. 17 depicts the endless conveyor 58, a drive shaft assembly 292, a hydraulic motor 294 coupled to the drive shaft assembly 292, an idler shaft assembly 296 in substantially-parallel, spaced relationship to the drive shaft 292 (see also FIG. 22A), a plurality of chains 298 enmeshed with a corresponding plurality of sprockets 300, 301 respectively disposed on the drive shaft assembly 292 and the idler shaft assembly 296, and a plurality of conveyor belts 304. In the illustrated embodiment, the conveyor 58 includes three conveyor belts 304 that respectively define three conveyor segments 311, 312, 313 (FIG. 21). In other embodiments, the number of conveyor segments can be varied.

Figure 14:
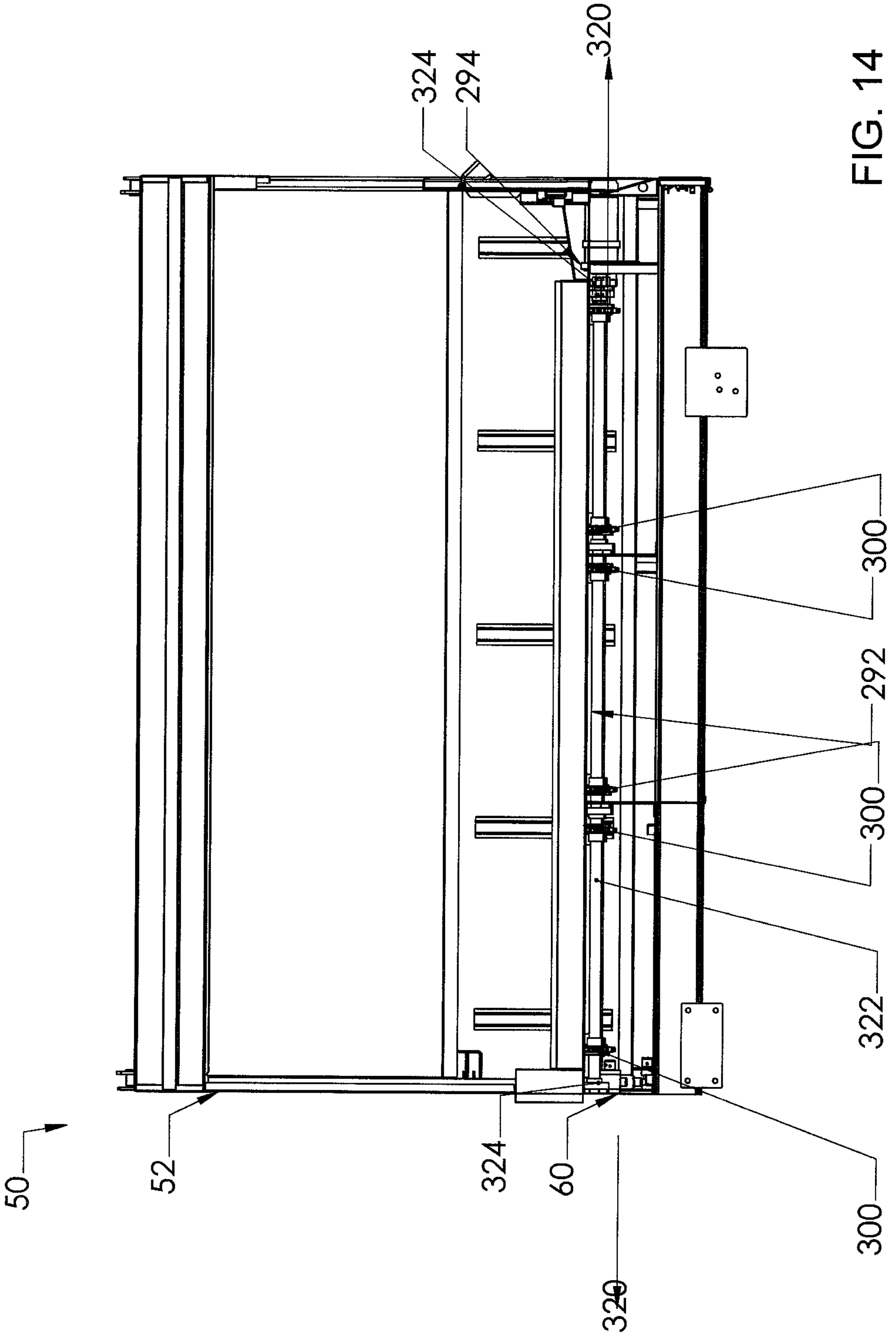
FIG. 14 is a cross-sectional view of the chipper body of FIG. 1 taken along line 14-14 in FIG. 2.
Figure 15:
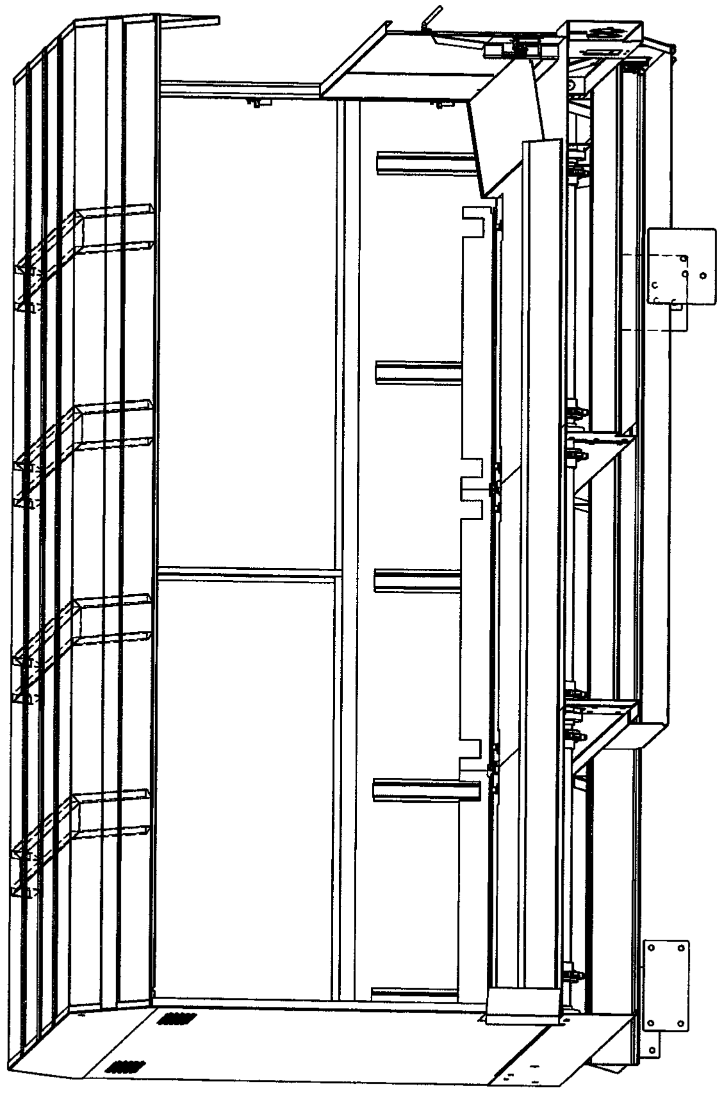
FIG. 15 is the cross-sectional view of FIG. 14 in perspective.
Figure 16:
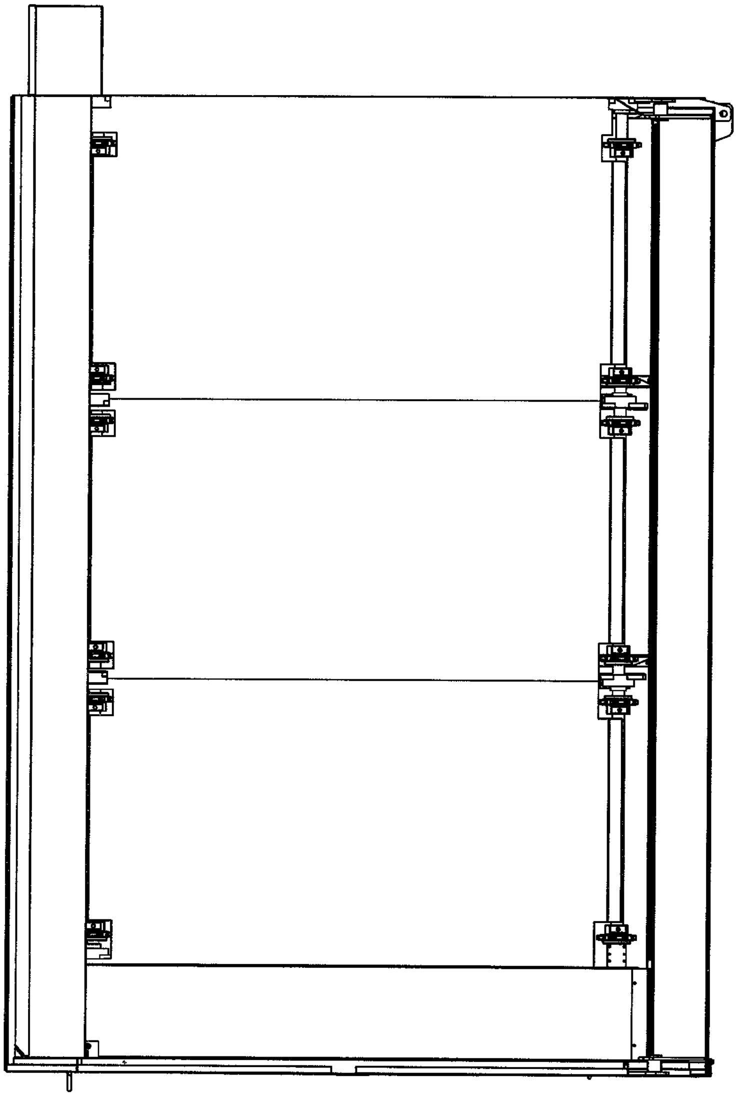
FIG. 16 is a cross-sectional view of the chipper body of FIG. 1 taken along line 16-16 in FIG. 2.

FIG. 14 depicts a drive shaft assembly 292 which is supported by the base 60 of the forestry box 52. The drive shaft assembly 292 extends along a longitudinal axis 320 configured to be substantially parallel to the longitudinal axis of the chipper body 50. The drive shaft assembly 292 includes a drive shaft 322, a bearing 324 at each end thereof to allow the drive shaft 322 to rotate about its longitudinal axis 320, and the series of sprockets 300 which are spaced along the longitudinal axis 320 of the drive shaft assembly to accommodate the three conveyor belts such that there is a sprocket 300 disposed at each edge of each conveyor belt.

The hydraulic motor 294 can be connected either directly or indirectly to the drive shaft assembly 292 by any conventional means. The hydraulic motor 294 can be selectively operated via a common hydraulic fluid source that is also used to operate the hydraulic lower door cylinder. The hydraulic motor 294 for the conveyor can be selectively operated via a controller disposed in at least one location, such as the cab of the truck to which the chipper body is mounted or to the exterior of the forestry box, for example.

Figure 12:
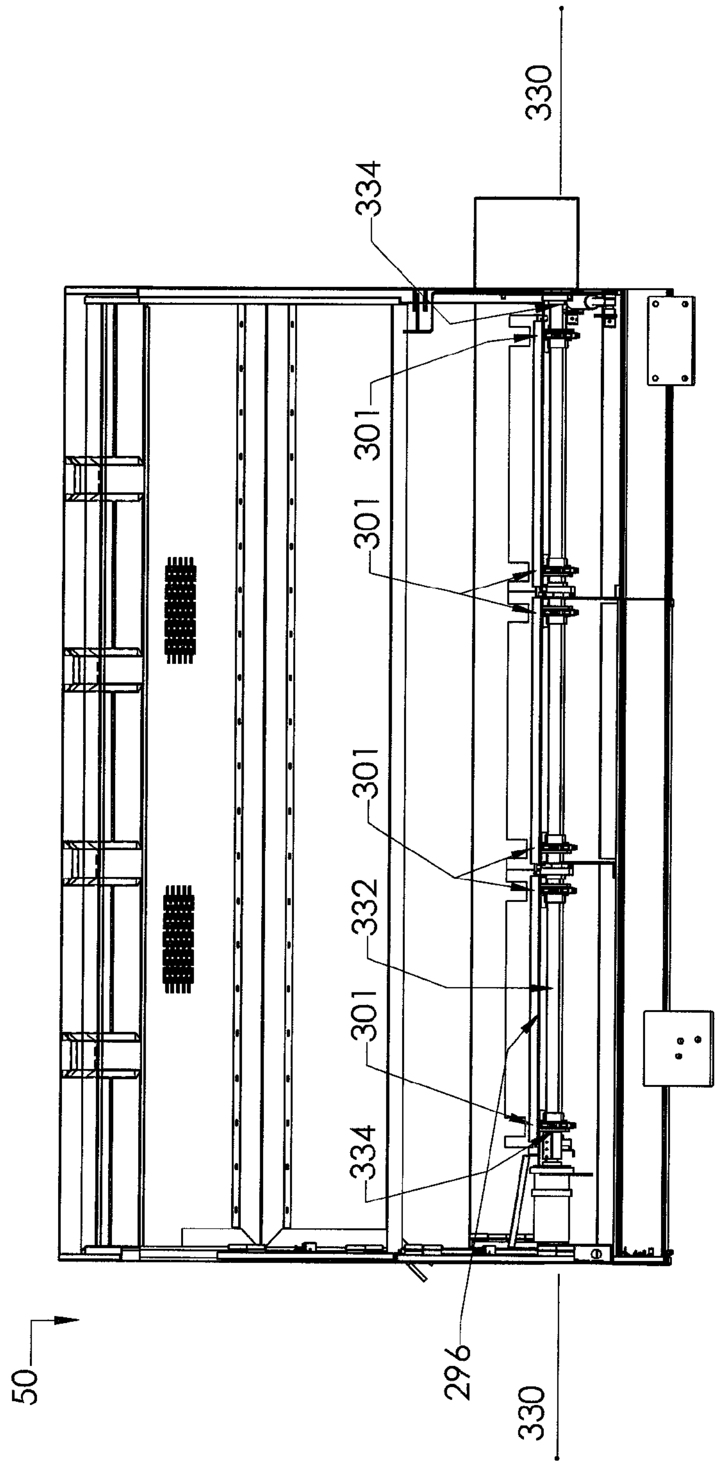
FIG. 12 is a cross-sectional view of the chipper body of FIG. 1 taken along line 12-12 in FIG. 2.
Figure 13:
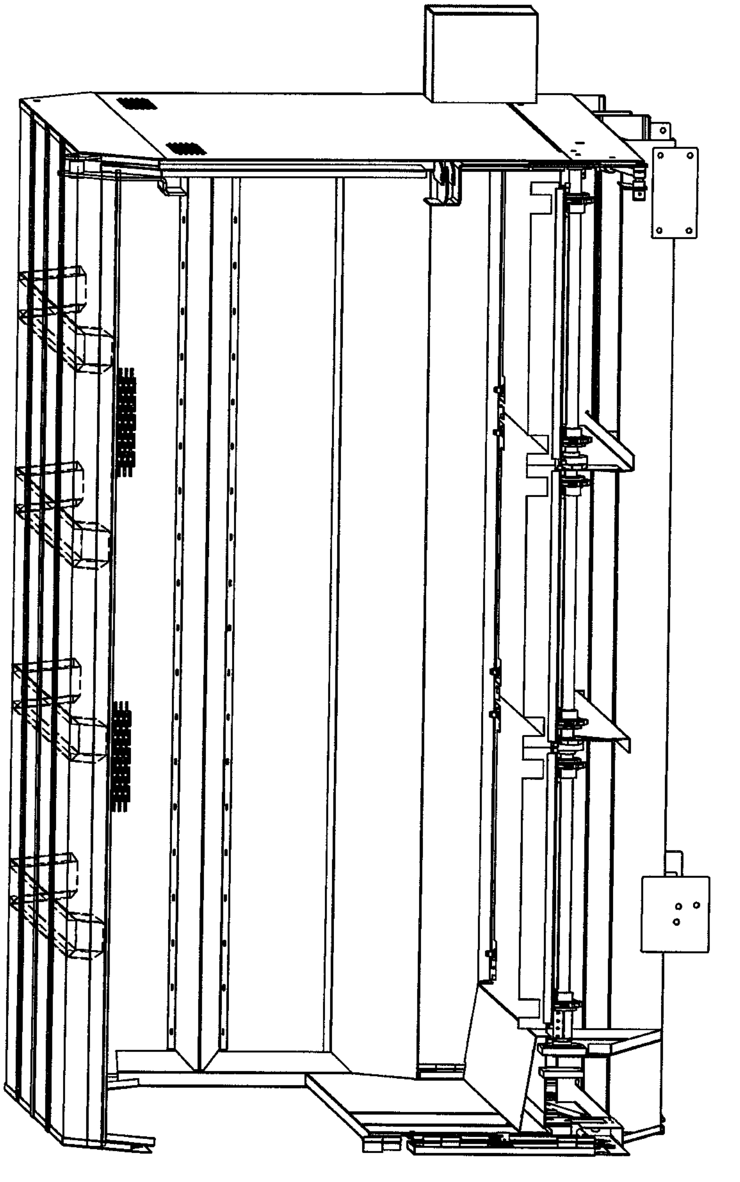
FIG. 13 is the cross-sectional view of FIG. 12 in perspective.

Referring to FIG. 12, the idler shaft assembly 296 can have substantially the same construction as the drive shaft. The idler shaft assembly 296 extends along a longitudinal axis 330 that is substantially parallel to the longitudinal axis of the chipper body 50. The idler shaft assembly 296 includes an idler shaft 332, a bearing 334 at each end thereof to allow the idler shaft 332 to rotate about its longitudinal axis 330, and the series of sprockets 301 which are spaced along the longitudinal axis 330 of the idler shaft assembly to accommodate the three conveyor belts such that there is a sprocket 301 disposed at each edge of each conveyor belt.

Figure 28:
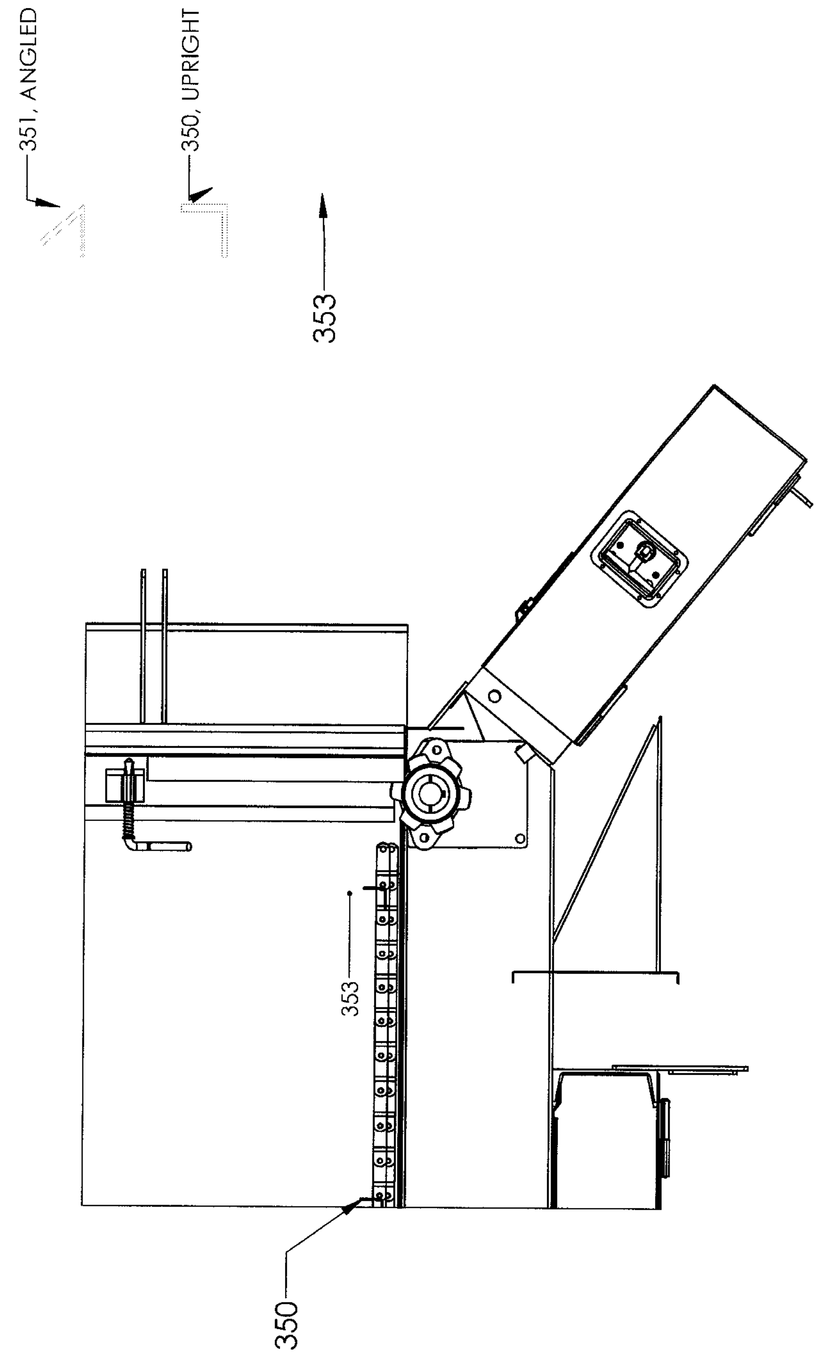
FIG. 28 is an enlarged detail view taken from FIG. 26 as indicated by circle 28.
Figure 29:
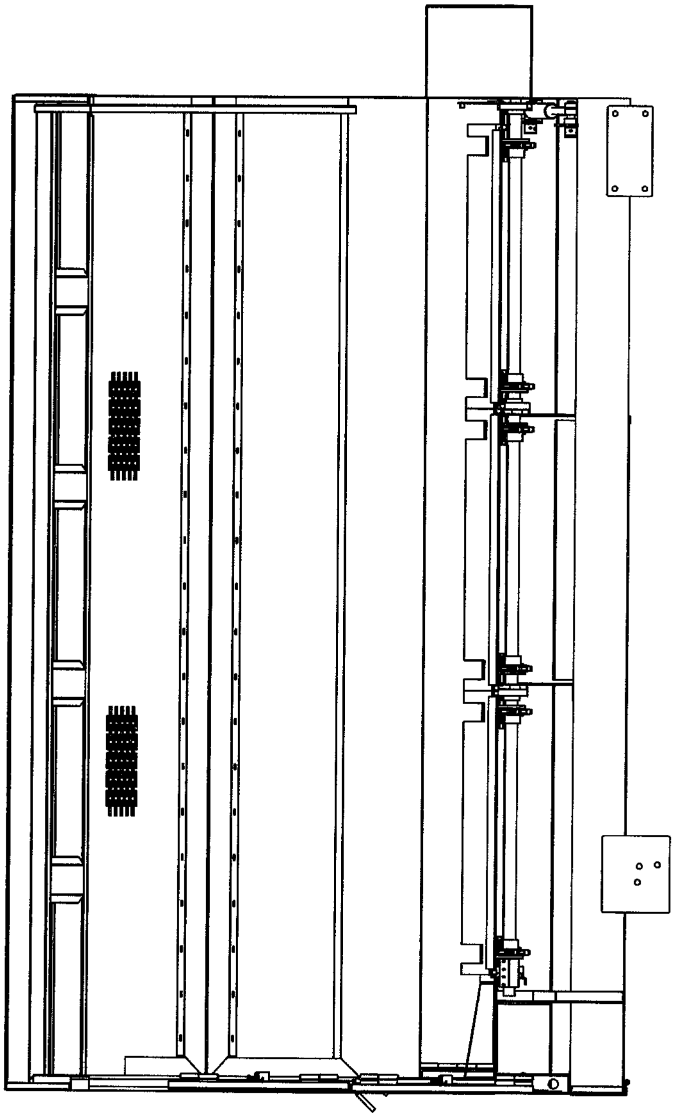
FIG. 29 is a cross-sectional view of the chipper body of FIG. 1 taken along line 29-29 in FIG. 18.
Figure 30:
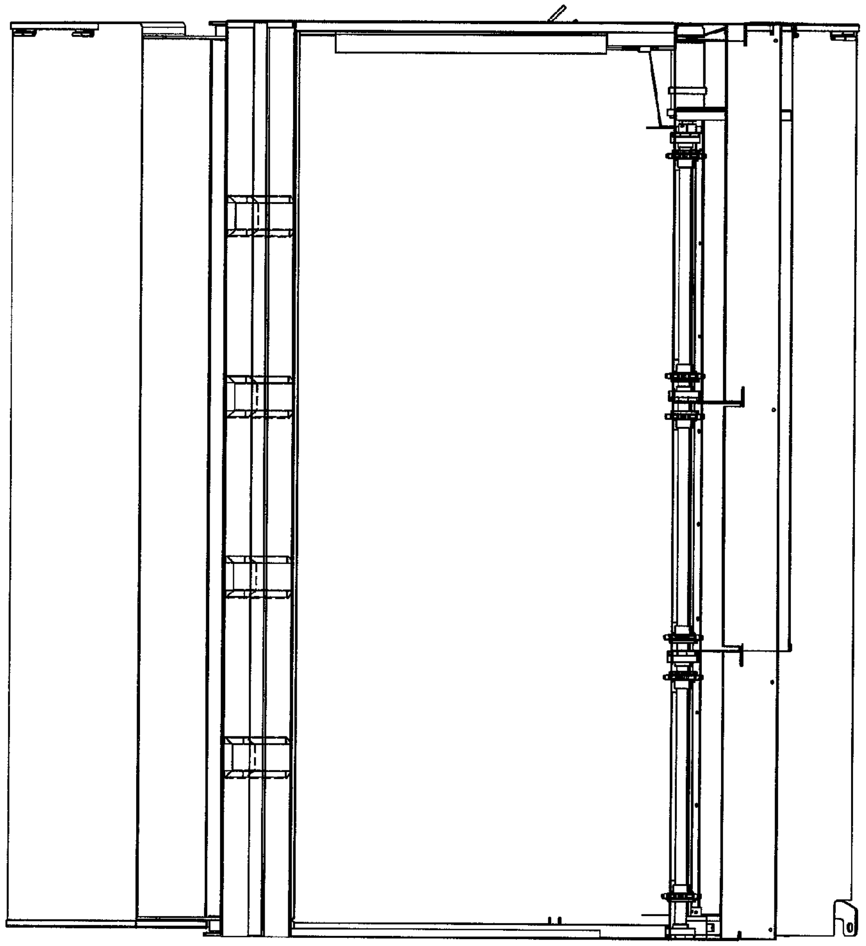
FIG. 30 is a cross-sectional view of the chipper body of FIG. 1 taken along line 30-30 in FIG. 18.
Figure 31:
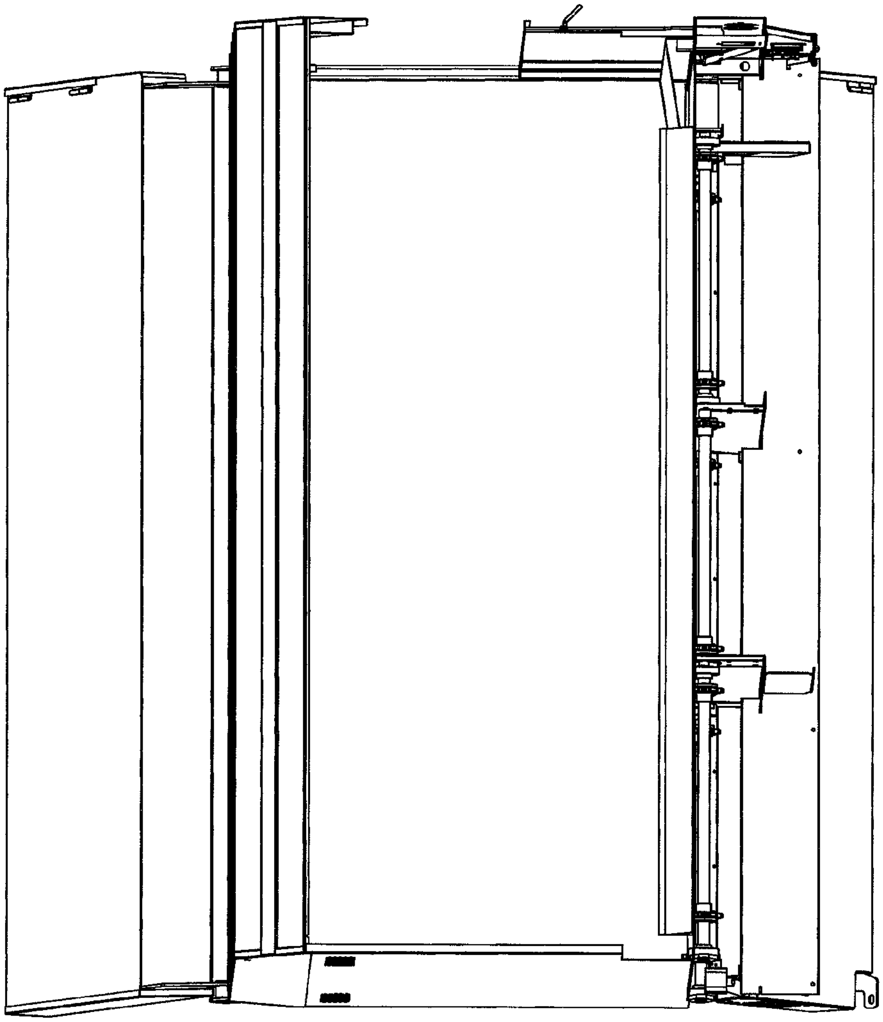
FIG. 31 is the cross-sectional view of FIG. 30 in perspective.
Figure 32:
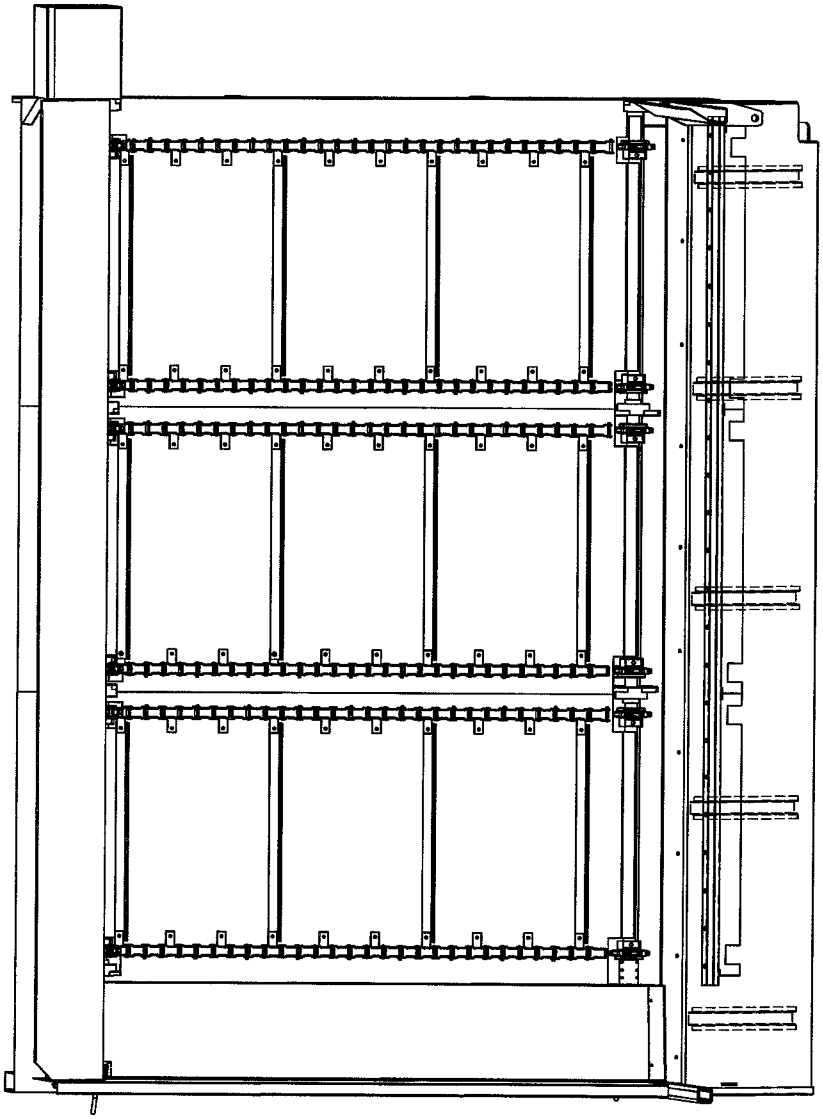
FIG. 32 is a cross-sectional view, in perspective, of the chipper body of FIG. 1 taken along line 32-32 in FIG. 18.
Figure 33:
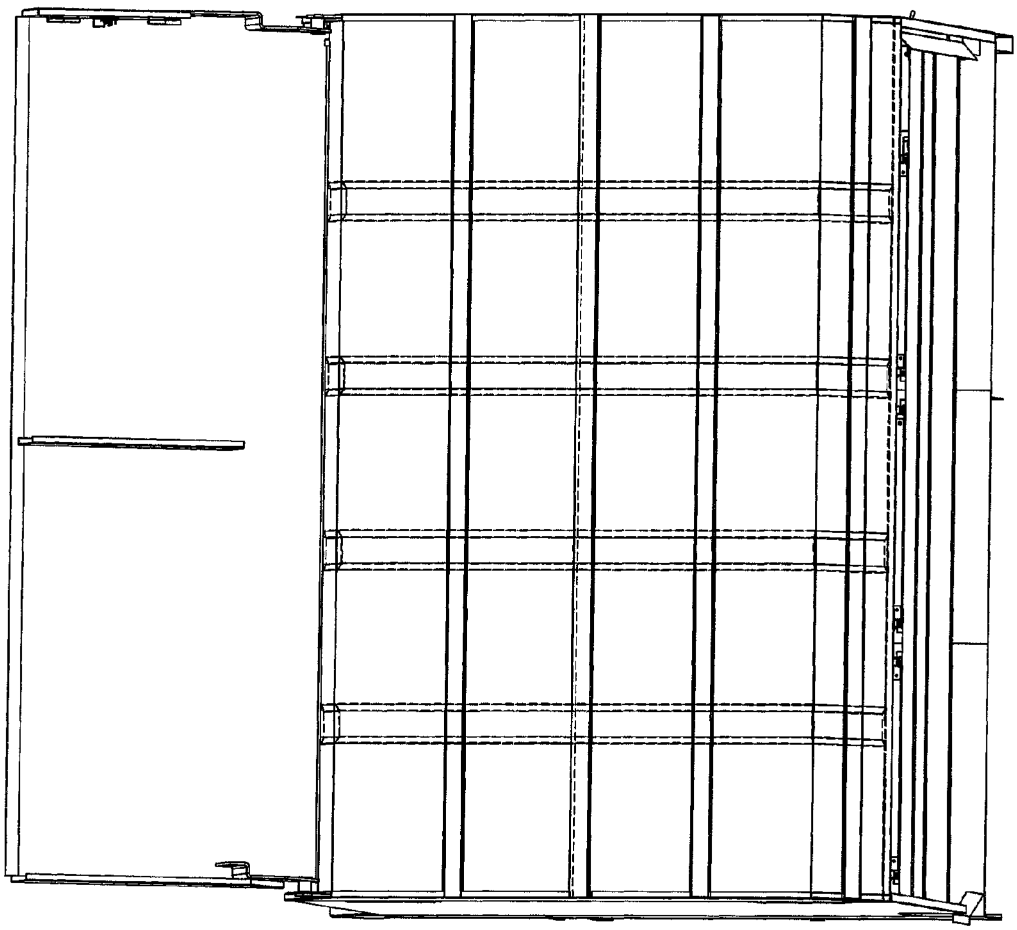
FIG. 33 is a cross-sectional view, in perspective, of the chipper body of FIG. 1 taken along line 33-33 in FIG. 18.
Figure 34:
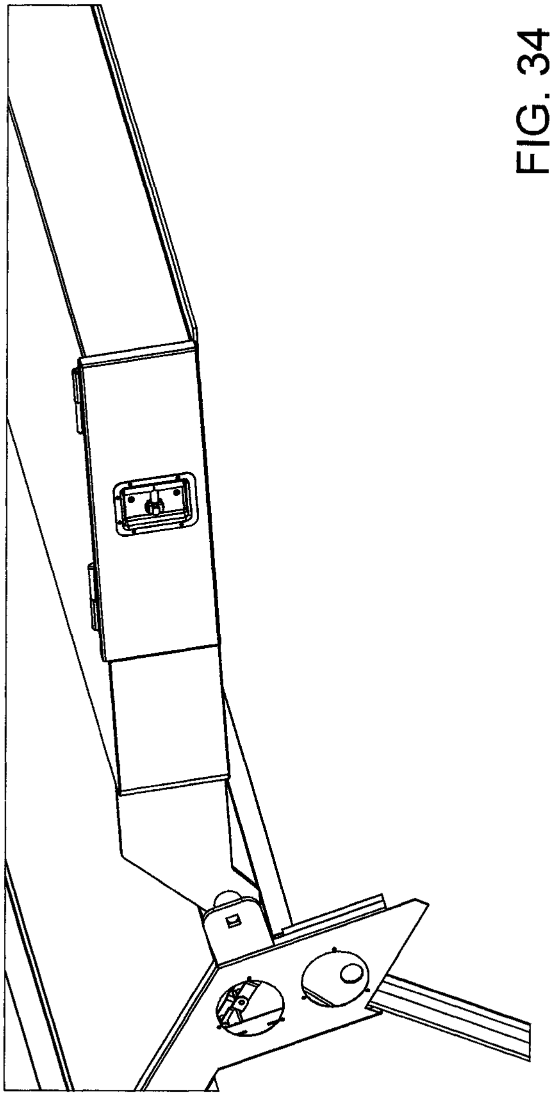
FIG. 34 is an enlarged detail view taken from FIG. 17 as indicated by circle 34 and shown in isometric view.

Turning again to FIG. 17, each chain 298 is in the form of an endless loop which extends along the transverse axis of the chipper body 50, which is substantially perpendicular to the longitudinal axes of the drive shaft assembly 292, the idler shaft assembly 296, and the chipper body 50. Each chain 298 is enmeshed with a corresponding sprocket 300, 301 of the drive shaft assembly 292 and the idler shaft assembly 296. Each conveyor belt 304 extends along a transverse axis of the chipper body, which is substantially perpendicular to the longitudinal axes of the drive shaft assembly 292, the idler shaft assembly 296, and the chipper body 50. Each conveyor belt 304 is mounted to a pair of adjacent chains 298 and includes a plurality of upright flanges or plows 350 arranged in spaced transverse relationship to each other to facilitate the movement of landscape chips disposed upon the conveyor belt in the discharge direction out of the forestry box through the side doors. In some embodiments the flanges or plows 350 may be slanted at an angle rather than being configured in an upright, perpendicular manner. This may be better understood by reference to FIG. 28 which shows the cross-section of flange 350 to be upright, or perpendicular with respect to the direction of motion 353 of the conveyor 58 which is substantially parallel to the bed of forestry box 52. In embodiments featuring an angled flange 351, the angle is generally in the opposite direction of the direction of motion 353 at approximately 15 degrees from perpendicular, but may be as much as 45 degrees from perpendicular or as little as 1 degree from perpendicular. In some embodiments the flanges may be angled towards the direction of motion 353 of the conveyor 58. However, empirical results indicate that angling the flange 351 in a direction opposite the direction of motion 353 tends to prevent chipped landscape materials from jamming up beneath the conveyor 58.

In other embodiments, the side doors can be mounted to the left side of the chipper body. In still other embodiments, the chipper body can include a set of doors on each side, and the conveyor can include a reversible motor (or a pair of motors) for selective operation of the conveyor in either a rightward discharge direction with the right lower door in an open position or in a leftward discharge direction with the left lower door in an open position. In yet other embodiments, the upper door can be omitted. A wall portion can be provided that extends between the support arm, the front end, and the canopy so that the portion of the side of the chipper body above the door is closed.

Figure 35:
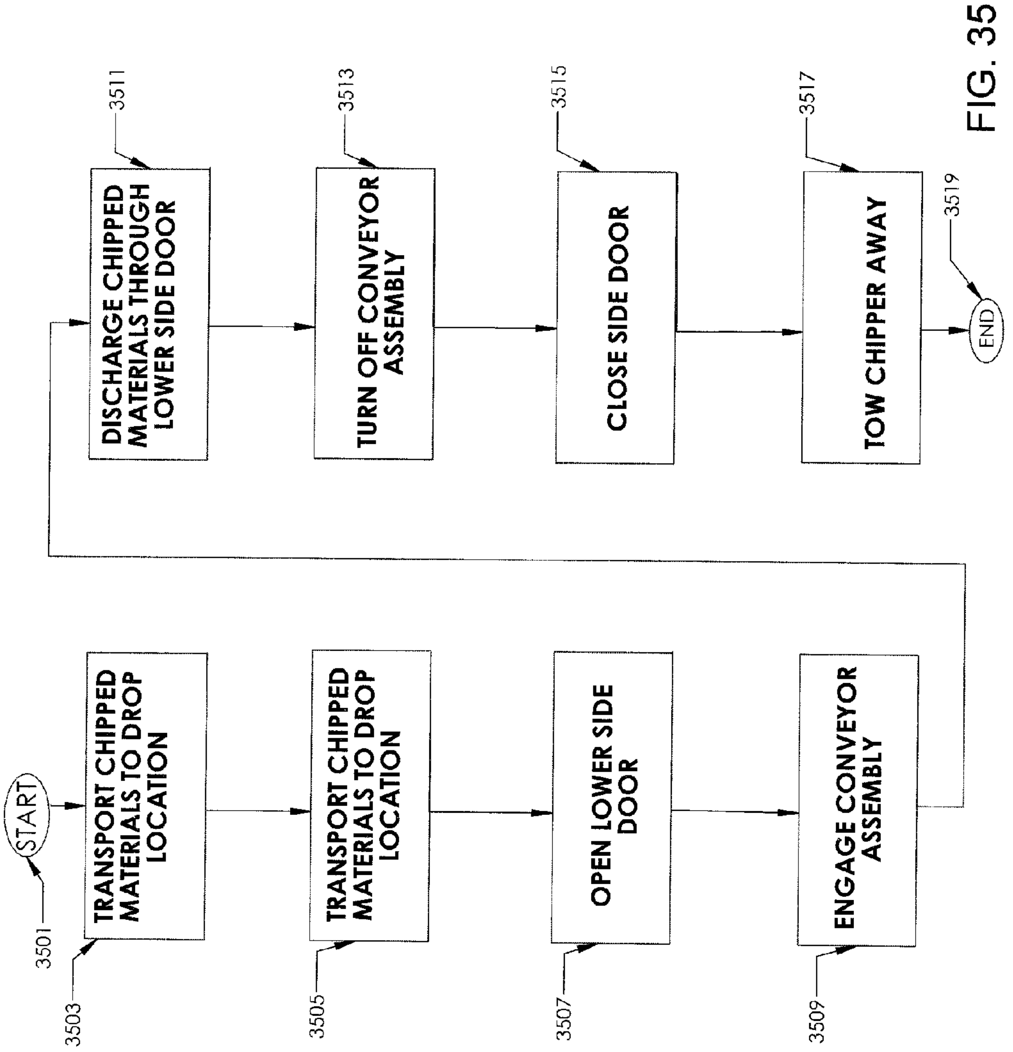
FIG. 35 depicts the flowchart of a method for practicing various embodiments.

FIG. 35 depicts the flowchart of a method for practicing various embodiments of disposing of chipped materials from a side-discharge chipper body 50. The method begins at block 3501 and proceeds to 3503 where chipped materials—for example, chipped landscape waste—are received. The chipped materials may be blown in through a rear door of the side-discharge chipper body from a chipper. Typically, the chipper is a tow-behind chipper hitched to the truck or other vehicle on which the side-discharge chipper body is mounted. The method then proceeds to 3505. Once the chipper body 50 is full, or when the landscaping job is completed, the vehicle may be driven to a drop location for the chipped materials. Typically, the truck is configured with a hitch for towing the chipper. In this way, the truck can tow the chipper to a landscaping location, load the side-discharge chipper body with chipped materials, and then drive to the drop location for the chipped materials while towing the chipper along behind.

Figure 18:
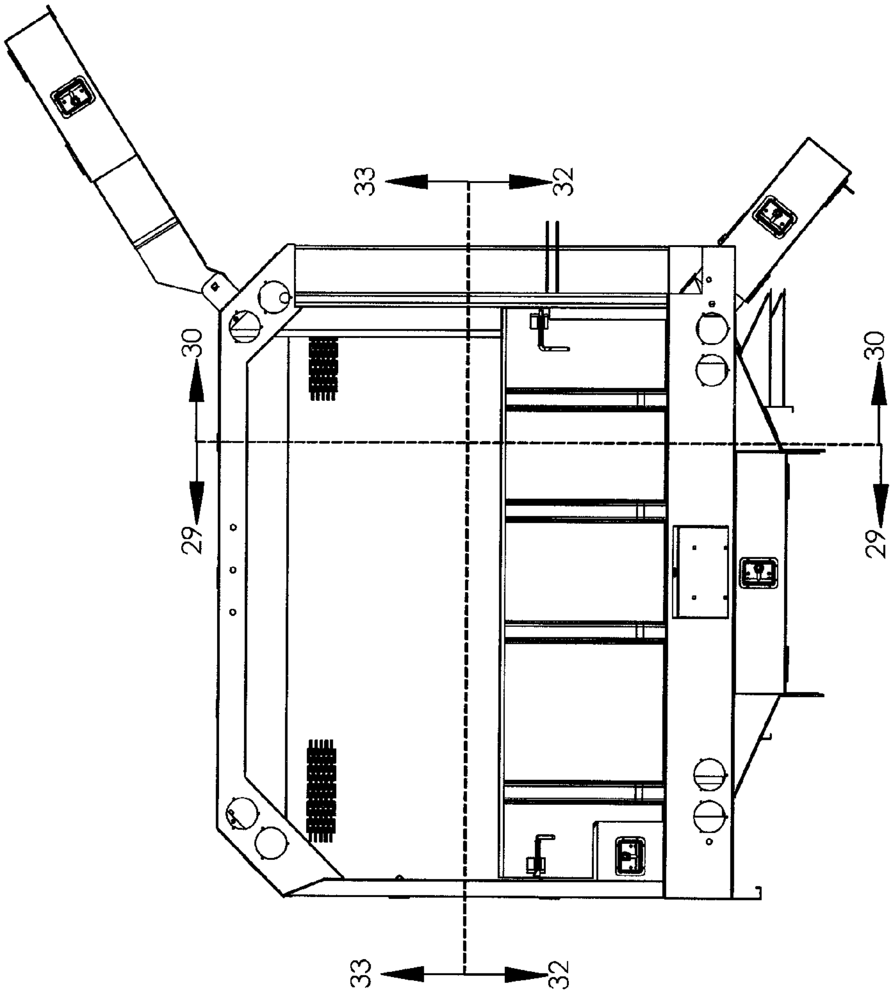
FIG. 18 is a rear elevational view of the chipper body of FIG. 1 with the side doors in the fully open position.

Upon arriving at the drop location for the chipped materials, the lower side door 54 is opened in 3507 to uncover at least a bottom portion of the side opening. The lower side door 54 typically opens by pivoting about a lower door pivot axis that runs in a longitudinal direction near a bottom end of the side opening in the chipper body 50. The lower door is typically opened to a position substantially 45 degrees below horizontal, as shown in FIGS. 17 and 18. In this way the chipped materials being ejected are dropped somewhat away from the vehicle, say, at least one foot or more away. The upper side door 56 may either be opened (e.g., if all the chipped material are being ejected), or remain closed if only a portion of the chipped material load is being emptied. Leaving the upper side door 56 closed while running the conveyor assembly 58 allows the operator to meter out a controlled amount of chipped materials through the opened lower side door 54. Once the lower side door 54 is opened in 3507 the method proceeds to 3509.

In block 3509 the conveyor assembly is engaged to push the chipped materials towards the side door opening, discharging them, as per block 3511, out of the side-discharge chipper body 50 and onto the ground. Having the lower door is typically opened to substantially 45 degrees below horizontal tends to make the chipped materials tumble away from the truck, keeping them from accumulating beneath the wheels as the chipper body 50 is being emptied. Once block 3511 is completed and the chipped materials have been discharged from the chipper body 50, the method proceeds to 3513 to turn off the conveyor assembly 58. In block 3515 the lower side door 54 is closed. If the upper side door 56 was opened, it is typically closed at this time as well. Once the side doors are closed and secured, the method proceeds to block 3515, and the vehicle may be moved, towing the chipper away. The method ends in 3519.

Aspects of the present invention may be described with reference to flowchart illustrations and/or block diagrams of methods, apparatus, systems, and computer program products according to various embodiments disclosed herein. It will be understood that blocks of the flowchart illustrations and/or block diagrams, and combinations of blocks in the flowchart illustrations and/or block diagrams. The flowchart and/or block diagrams in the figures help to illustrate the architecture, functionality, and operation of possible implementations of systems, and methods of using the various embodiments of the present invention. In this regard, each block in the flowchart or block diagrams may represent an act, step or other activity for implementing the specified function (s). It should also be noted that, in some alternative implementations, the functions noted in the block may occur in an order other than that depicted in the figures. For example, two blocks shown in succession may, in fact, be executed substantially concurrently, or the blocks and activities of the figures may sometimes be executed in reverse order or in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and activities.

The term “chipped materials” is used herein to describe materials from a chipper—for example, a tow-behind wood chipper—that are blown into or otherwise delivered to a side-discharge chipper body as described herein. Typically, the chipped materials are tree branches, logs, weeds, or some type of landscape waste. However, in some implementations a chipper may be used to grind up excess or waste lumber or other construction materials, trash, or other materials that may be more easily transported or decomposed by grinding them up or running them through a chipper. The embodiments have been described herein in terms of a truck mounted chipper body. However, some embodiments may be implemented as trailer mounted chipper bodies suitable for towing behind a truck or other vehicle. In yet other embodiments the chipper body may be configured to be towed behind the chipper, with the access door for loading the chipper body located at the front rather than the back. These, and various other configurations known to those of ordinary skill in the art, fall within the scope of this disclosure.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises,” “comprising,” “includes,” and/or “including” used in this specification specify the presence of stated features, integers, steps, operations, elements, and/or components, but do not preclude the presence or addition of one or more other features, steps, operations, elements, components, and/or groups thereof. The term “plurality”, as used herein and in the claims, means two or more of a named element. It should not, however, be interpreted to necessarily refer to every instance of the named element in the entire device. Particularly, if there is a reference to “each” element of a “plurality” of elements. There may be additional elements in the entire device that are not be included in the “plurality” and are not, therefore, referred to by “each.”

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

What is claimed is:

1. A side-discharge chipper body suitable for receiving and hauling chipped materials from a tow-behind chipper and configured to be mounted on a movable vehicle, the side-discharge chipper body comprising:

a first opening on a first side of the side-discharge chipper body at a longitudinal back end of the vehicle, the first opening being configured to receive the chipped materials from the chipper;

a second opening on a second side of the side-discharge chipper body configured to discharge said chipped materials from the side-discharge chipper body;

a conveyor assembly configured to discharge said chipped materials through the second opening from the side-discharge chipper body, wherein the conveyor assembly comprises at least one conveyor belt positioned within the side-discharge chipper body along a bottom side of the side-discharge chipper body to support the chipped materials received in the side-discharge chipper body;

a side door configured to be placed in one or more open positions to discharge said chipped materials and a closed position to cover at least a bottom portion of said second opening;

a flexible wear strip affixed to said first side door and adapted to contactingly engage a discharge end of the conveyor assembly; and a hitch configured to removably attach to the tow-behind chipper for pulling the tow-behind chipper behind said vehicle;

wherein said at least one conveyor belt, upon being engaged, is configured to convey the chipped materials through the second opening and out of the side-discharge chipper body in a direction substantially parallel to the vehicle axel; and wherein the second side is substantially perpendicular to the first side.

2. The side-discharge chipper body of claim 1, wherein the side-discharge chipper body is configured to be mounted on a movable vehicle comprising a vehicle axel; and wherein said the conveyor assembly is configured to convey said chipped materials in a direction parallel to the vehicle axel to discharge said chipped materials from a side of said vehicle.

3. The side-discharge chipper body of claim 1, wherein the side door is a lower side door configured to pivot about a lower door pivot axis between the one or more open positions and the closed position to removably cover at least the bottom portion of said second opening, said lower door pivot axis runs in a longitudinal direction near a bottom end of said second opening.

4. The side-discharge chipper body of claim 3, wherein said chipped materials comprise waste landscape materials; and wherein one of said one or more open positions is a first open position that is substantially 45 degrees below horizontal; and wherein said lower side door in the first open position discharges the chipped materials at least one foot away from the second side of the side-discharge chipper body.

5. The side-discharge chipper body of claim 3, further comprising:

an upper side door located above the lower side door and configured to pivot about an upper door pivot axis between an open position and a closed position over a top portion of said second opening, said upper door pivot axis being near a top end of said second opening; and a tailgate configured to cover at least a bottom portion of the first opening.

6. The side-discharge chipper body of claim 1, wherein the flexible wear strip is a rubber wear strip.

7. The side-discharge chipper body of claim 1, wherein said vehicle is a truck, the side-discharge chipper body further comprising:

one or more beams adapted to mount the side-discharge chipper body to a chassis of said truck.

8. The side-discharge chipper body of claim 1, wherein the side-discharge chipper body is adapted to store the chipped materials received in the side-discharge chipper body while the side-discharge chipper body is being transported from one location to another location.

9. A landscape removal system comprising:

a vehicle with a vehicle chassis;

a side-discharge chipper body arranged to receive chipped materials, the side-discharge chipper body including a conveyor assembly configured to discharge said chipped materials through a side opening, the conveyor assembly including a discharge end from which conveyed chipped landscape material falls through said side opening;

mounting means for mounting the side-discharge chipper body to the vehicle chassis;

a trailer hitch suitable for pulling a chipper configured to direct the chipped materials through a rear opening of the side-discharge chipper body; and a side door pivotally mounted to the side-discharge chipper body and arranged, upon being opened, to expel said chipped materials from the conveyor assembly through said side opening, the side door including a lower edge and a filler member extending from the lower edge and adapted to contactingly engage the discharge end of the conveyor assembly upon the side door being in at least one open position;

wherein the side door includes a hinged cover which is movable over a range of travel between a closed position and an open position;

wherein the conveyor assembly comprises at least one conveyor belt positioned within the side-discharge chipper body along a bottom side of the side-discharge chipper body to support the chipped materials received in the side-discharge chipper body; and wherein the rear opening is substantially perpendicular to the side opening.

10. The landscape removal system of claim 9, wherein the side door is movable over a range of travel between a closed position and an open position, the side-discharge chipper body further comprising:

a hydraulic cylinder including first and second ends, the first end connected to the forestry box and the second end connected to the side door, the hydraulic cylinder adapted to move the side door over the range of travel between the closed position and the open position.

11. The landscape removal system of claim 9, wherein the side door is configured to cover an equipment storage area in the closed position and provide access to the storage area in the open position.

12. The landscape removal system of claim 9, wherein said at least one conveyor belt, upon being engaged, is configured to convey the chipped materials through the side opening and out of the, side-discharge chipper body.

13. The landscape removal system of claim 9, wherein the side-discharge chipper body is adapted to store the chipped materials received in the side-discharge chipper body while the side-discharge chipper body is being transported from one location to another location.

14. The landscape removal system of claim 9, wherein the conveyor assembly is configured to discharge said chipped materials through the side opening at least one foot away from the side-discharge chipper body.

15. A method of disposing chipped materials from a side-discharge chipper body, the method comprising:

receiving the chipped materials from a chipper through a first opening on a first side of the side-discharge chipper body;

opening a lower side door configured to removably cover at least a bottom portion of a second opening by pivoting about a lower door pivot axis that runs in a longitudinal direction near a bottom end of said second opening; and operating at least one conveyor belt of a conveyor assembly configured to discharge said chipped materials through the second opening from the side-discharge chipper body, said at least one conveyor belt being positioned within the side-discharge chipper body along a bottom side of the side-discharge chipper body to support the chipped materials received in the side-discharge chipper body;

wherein the first side is perpendicular to the second side; and wherein the lower side door is hinged to be movable over a range of travel between a closed position and an open position.

16. The method of claim 15, wherein the side-discharge chipper body is configured to be mounted on a movable vehicle; and wherein the first side is at a longitudinal back end of the vehicle.

17. The method of claim 15, wherein said chipped materials comprise waste landscape materials, the method further comprising:

pivoting the lower side door about a lower door pivot axis to the open position substantially 45 degrees below horizontal.

18. The method of claim 17, further comprising:

discharging the chipped materials at least one foot away from the second side of the side-discharge chipper body.

19. The method of claim 15, further comprising:

storing the chipped materials received in the side-discharge chipper body while the side-discharge chipper body is being transported from one location to another location.

20. The method of claim 15, wherein the side-discharge chipper body is configured to be mounted on a movable vehicle comprising a vehicle axel; and wherein said the conveyor assembly is configured to convey said chipped materials in a direction parallel to the vehicle axel to discharge said chipped materials from a side of said vehicle.

* * * * *